(12) United States Patent
Hillman et al.

(10) Patent No.: US 12,459,195 B2
(45) Date of Patent: Nov. 4, 2025

(54) BIOPRINTER

(71) Applicant: BiOHIP Corporation, New York, NY (US)

(72) Inventors: Avriel Hillman, New York, NY (US); Michael Liebschener, New York, NY (US); Peter Alexander, New York, NY (US)

( * ) Notice: Subject to any disclaimer, the term of this patent is extended or adjusted under 35 U.S.C. 154(b) by 0 days.

(21) Appl. No.: 18/106,070

(22) Filed: Feb. 6, 2023

(65) Prior Publication Data

US 2023/0249395 A1 Aug. 10, 2023

Related U.S. Application Data

(60) Provisional application No. 63/307,542, filed on Feb. 7, 2022, provisional application No. 63/310,870, filed on Feb. 16, 2022, provisional application No. 63/409,345, filed on Sep. 23, 2022, provisional application No. 63/307,562, filed on Feb. 7, 2022, provisional application No. 63/409,363, filed on Sep. 23, 2022, provisional application No. 63/306,990, filed on Feb. 4, 2022, provisional application No. 63/306,964, filed on Feb. 4, 2022, provisional application No. 63/307,608, filed on Feb. 7, 2022.

(51) Int. Cl.
*B29C 64/112* (2017.01)
*A61F 2/02* (2006.01)
*B33Y 30/00* (2015.01)

(52) U.S. Cl.
CPC ............ *B29C 64/112* (2017.08); *A61F 2/02* (2013.01); *B33Y 30/00* (2014.12); *A61F 2240/00* (2013.01)

(58) Field of Classification Search
CPC ..... B29C 64/112; B29C 64/124; B33Y 10/00; B33Y 30/00; B33Y 50/00; B33Y 80/00; A61F 2/02
See application file for complete search history.

(56) References Cited

U.S. PATENT DOCUMENTS

2015/0017131 A1* 1/2015 Fabrikant ............... A61K 35/36
264/308
2015/0183167 A1* 7/2015 Molinari ............... B29C 64/336
425/375

* cited by examiner

*Primary Examiner* — Mathieu D Vargot
(74) *Attorney, Agent, or Firm* — MEDLER FERRO WOODHOUSE & MILLS PLLC

(57) ABSTRACT

At a high level, disclosed herein is a bioprinter configured to fabricate a single but highly complex and multi-material regenerative scaffold compared to a more traditional approach of mass production of simple shapes. In an embodiment, printer may include a multi-head, multi-axial bio-printer for extrusion printing and laser manipulation of scaffold and/or organic materials specific to a particular tissue such as without limitation customized vascularized bone graft or joint replacement tissue. Printer may facilitate controlled deposition of cells, biologics, and/or scaffold and organic materials in controlled, mixed gradients.

20 Claims, 14 Drawing Sheets

BIOPRINTER

CROSS-REFERENCE TO RELATED APPLICATIONS

This application claims the benefit of priority of U.S. Provisional Patent Application Ser. No. 63/307,542, filed on Feb. 7, 2022, and entitled "BIOPRINTER", U.S. Provisional Application Ser. No. 63/310,870, filed on Feb. 16, 2022, and entitled "BIOPRINTER SOFTWARE," U.S. Provisional Application Ser. No. 63/409,345, filed on Sep. 23, 2022, and entitled "ROBOT ARM PRINTER," U.S. Provisional Application Ser. No. 63/307,562, filed on Feb. 7, 2022, and entitled "TRANSPORT," U.S. Provisional Application Ser. No. 63/409,363, filed on Sep. 23, 2022, and entitled "IMPLANT," Provisional Application Serial No. 63/306,990, filed on Feb. 4, 2022, and entitled "BIOREACTOR PATENT APPLICATION," U.S. Provisional Application Ser. No. 63/306,964, filed on Feb. 4, 2022, and entitled "ANGIOGENIC SCREW," U.S. Provisional Application Ser. No. 63/307,608, filed on Feb. 7, 2022, and entitled "SMART DEBRIDEMENT TOOL SYSTEM PATENT APPLICATION," the entireties of all which are incorporated herein by reference.

FIELD OF THE INVENTION

The present invention generally relates to the field of additive manufacturing devices. In particular, the present invention is directed to a bioprinter.

BACKGROUND

Additive manufacturing devices have thus far been inadequate to the task of producing complex and effective implants. Additionally, existing printers and corresponding software thereof are inadequate to challenges presented in workpiece generation.

SUMMARY OF THE DISCLOSURE

In an aspect, the present invention relates to a bioprinter. The bioprinter includes a base plate, a printhead comprising a nozzle defining a lumen, wherein the printhead is configured to deposit a material on the base plate via the lumen, an arcuate track comprising a groove, wherein the printhead is slidably attached to the arcuate track by being at least partially disposed within the groove, a frame rotatably attached to the arcuate track, and a controller communicatively connected to the base plate, the arcuate track, and the frame, wherein the controller is configured to control movement of move of the base plate, the arcuate track, and the frame.

In another aspect, the present invention includes a bioprinter system. The bioprinter system includes a base plate, a printhead comprising a nozzle defining a lumen, wherein the printhead is configured to deposit a material on the base plate via the lumen, an arcuate track comprising a groove, wherein the printhead is slidably attached to the arcuate track by being at least partially disposed within the groove, a frame rotatably attached to the arcuate track, and an environmental chamber configured to provide specific environmental conditions for the material, a controller communicatively connected to the base plate, the arcuate track, and the frame, wherein the controller is configured to control movement of the base plate, the arcuate track, and the frame.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, a bioprinter is configured to fabricate a single but highly complex and multi-material regenerative scaffold compared to a more traditional approach of mass production of simple shapes. In an embodiment, bioprinter may include a multi-head, multi-axial bioprinter for extrusion printing and laser manipulation of scaffold and/or organic materials specific to a particular tissue, such as, and without limitation, a customized vascularized bone graft or joint replacement tissue. Bioprinter may facilitate controlled deposition of cells, biologics, and/or scaffold and organic materials in controlled, mixed gradients.

In some aspects, bioprinter may include and/or instantiate an orbital printer design to facilitate movement of different print heads and fueling of materials through a highly flexible rotating (suited to shape) visibility-oriented arch-bay system, whereby materials may be fed through each orbital shell determined by a need for a material in that arch/shell.

Figure 1A:
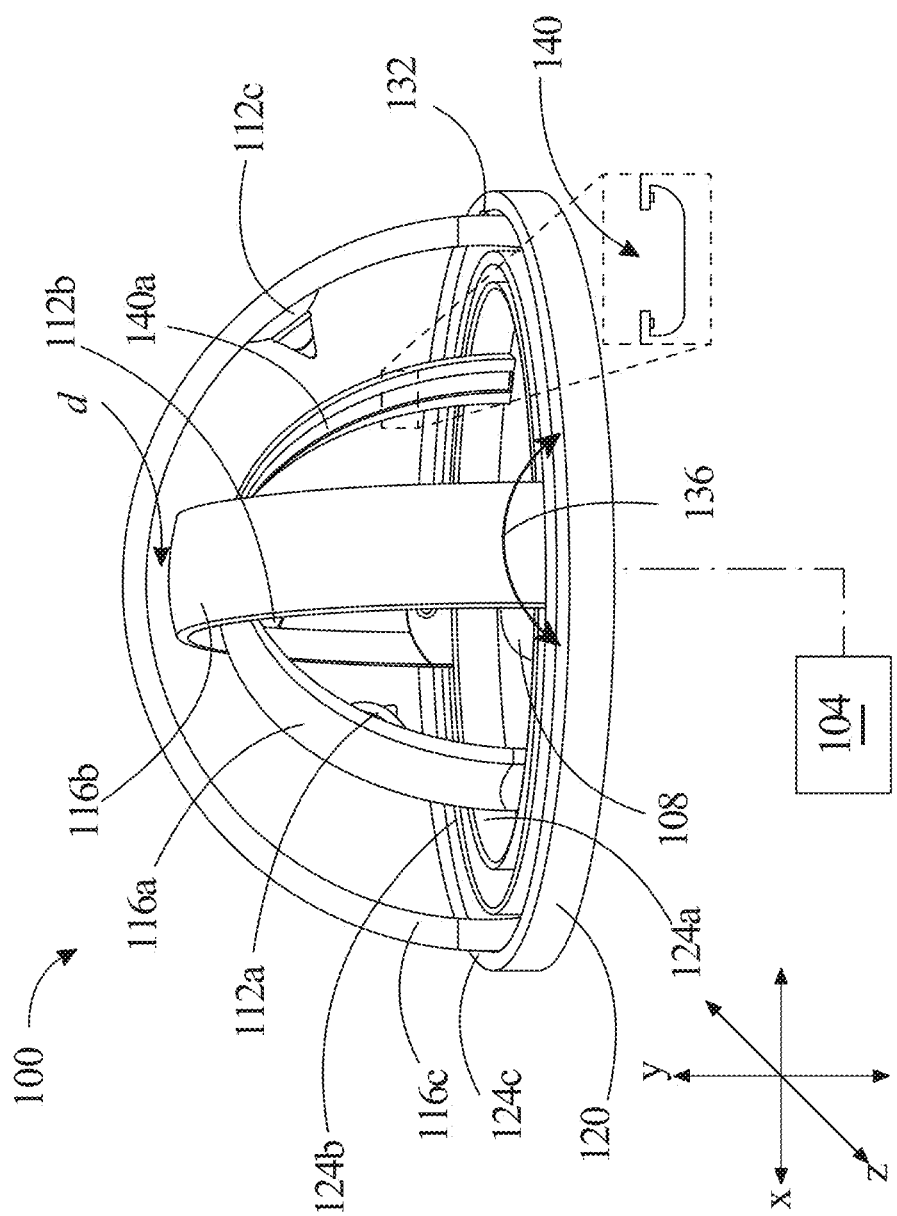
FIGS. 1A-1D are several views of schematic diagrams illustrating an exemplary embodiment of a bioprinter in various orientations in accordance with one or more embodiments of the present disclosure.

Now referring to the drawings, FIG. 1A illustrates a perspective view of an exemplary embodiment of a bioprinter 100 in accordance with one or more embodiments of the present disclosure. A "bioprinter", as used in this disclosure, is a manufacturing device that is configured to perform automated manufacturing processes using materials. A manufacturing device may include an additive or a subtractive manufacturing device. For the purposes of this disclosure, an "additive manufacturing device" is any device designed or configured to produce a component, product, or the like using an additive manufacturing process, in which material is deposited on the workpiece or object to be turned into the finished result. An "additive manufacturing process", for the purposes of this disclosure, is a process in which material is added incrementally to a body of material in a series of two or more successive steps. In one or more embodiments, material used in the additive manufacturing process by the bioprinter may be added in the form of a stack of incremental layers, where each layer may represent a cross-section of the object to be formed upon completion of the additive manufacturing process. Each cross-section may, as a non-limiting example, be modeled on a computing device as a cross-section of graphical representation of the object to be formed. For instance, and without limitation, a computer-aided design (CAD) tool may be used to receive or generate a three-dimensional model of the object to be formed, and a computerized process may derive from that model a series of cross-sectional layers that, when deposited during the additive manufacturing process, together will form the object. Such bioprinter software may be as described in U.S. Provisional Application Ser. No. 63/310,870, filed on Feb. 16, 2022, and entitled "BIOPRINTER SOFTWARE," the entirety of which is incorporated herein by reference. The steps performed by an additive manufacturing system to deposit each layer may be guided by a computer aided manufacturing (CAM) tool. In other embodiments, a series of layers are deposited in a substantially radial form, for instance by adding a succession of coatings to the workpiece. Similarly, the material may be added in volumetric increments other than layers, such as by depositing physical voxels in rectilinear or other forms. Additive manufacturing, as used in this disclosure, may specifically include manufacturing done at the atomic and nano level. Additive manufacturing may also include bodies of material that are a hybrid of other types of manufacturing processes. For example, and without limitation, forging and additive manufacturing, as described above in this disclosure. As an example, and without limitation, a forged body of material may have welded material deposited upon it which then includes an additive manufactured body of material.

Still referring to FIG. 1A, deposition of material in additive manufacturing processes may be accomplished by any suitable means, as understood by one or ordinary skill in the art. For instance, and without limitation, deposition may be accomplished using stereolithography, in which successive layers of polymer material are deposited and then caused to bind with previous layers using a curing process such as curing using ultraviolet light. Additive manufacturing processes may include "three-dimensional (3D) printing" processes that deposit successive layers of power and binder. In one or more embodiments, the powder may include a polymer or ceramic powder, and the binder may cause the powder to adhere, fuse, or otherwise join into a layer of material making up the body of material or product. Additive manufacturing may include metal three-dimensional printing techniques. For instance, and without limitation, additive manufacturing may include laser sintering including direct metal laser sintering (DMLS) or laser powder-bed fusion. Likewise, additive manufacturing may be accomplished by immersion in a solution that deposits layers of material on the body of material by depositing and sintering materials having melting points, such as, for example, metals. For instance, and without limitation, additive manufacturing may include selective laser sintering by applying fluid or paste-like materials in strips or sheets and then curing that material either by cooling, ultraviolet curing, and the like, any combination of the above methods, or any additional methods that involve depositing successive layers or other increments of material. In one or more embodiments, methods of additive manufacturing may include, without limitation, vat polymerization, material jetting, binder jetting, material extrusion, fuse deposition modeling, powder bed fusion, sheet lamination, and directed energy deposition. Methods of additive manufacturing may include adding material in increments of individual atoms, molecules, or other particles. An additive manufacturing process may use a single method of additive manufacturing or combine two or more methods.

Still referring to FIG. 1, bioprinter 100 may include a subtractive manufacturing device, which may perform one or more subtractive manufacturing processes. A "subtractive manufacturing device", for the purposes of this disclosure, is a manufacturing process that produces the product by removing material from a workpiece. The removal of material may be accomplished using abrasives, cutting tools or endmills, laser cutting or ablation, removal using heat, or any other method that removes material from the workpiece. Each subtractive manufacturing process used may be any suitable process, such as, but not limited to, rotary-tool milling, electronic discharge machining, ablation, etching, erosion, cutting, and cleaving, among others. If rotary-tool milling is utilized, this milling may be accomplished using any suitable type of milling equipment, such as milling equipment having either a vertically or horizontally oriented spindle shaft. Examples of milling equipment include bed mills, turret mills, C-frame mills, floor mills, gantry mills, knee mills, and ram-type mills, among others. In some embodiments, the milling equipment used for removing material may be of the computerized numerical control (CNC) type that is automated and operates by precisely programmed commands that control movement of one or more parts of the equipment to effect the material removal. CNC machines, their operation, programming, and relation to CAM tools and CAD tools are well known and need not be described in detail herein for those skilled in the art to understand the scope of the present invention and how to practice it in any of its widely varying forms. In one or more embodiments, subtractive manufacturing may be performed using spark-erosive devices. For instance, and without limitation, subtractive manufacturing may include removal of material using electronic discharge machining (EDM). EDM may include wire EDM, plunge EDM, immersive EDM, ram EDM, or any other EDM manufacturing technique. In one or more embodiments, subtractive manufacturing may be performed using laser-cutting processes. In other embodiments, subtractive manufacturing may be performed using water-jet or other fluid-jet cutting techniques. Fundamentally, any process for removal of material may be employed for subtractive manufacturing as understood by one of skill in the art.

Still referring to FIG. 1, bioprinter 100 may include an automated manufacturing system. For the purposes of this disclosure, an "automated manufacturing system" is a manufacturing device that includes a controller 104. Controller 104 may be, include, or be a part of a computing device, and may be configured to control one or more manufacturing steps and/or processes automatically. Computing device may include a controller, a microcontroller, a microprocessor, a SOC, and the like, as discussed further in this disclosure in FIG. 5. Computing device may include a sequential control device that produces a sequence of commands without feedback from other components of automated manufacturing system. Computing device may include a feedback control device that produces commands triggered or modified by feedback from other components. Computing device may perform both sequential and feedback control. In some embodiments, controller includes a mechanical device. In other embodiments, controller includes an electronic device. Electronic device may include digital or analog electronic components, including without limitation one or more logic circuits, such one or more logic gates, programmable elements such as field-programmable arrays, multiplexors, one or more operational amplifiers, one or more diodes, one or more transistors, one or more comparators, and one or more integrators. Electronic device may include a processor. Electronic device may include a computing device. Computing device may include any computing device as described below. Computing device may include a computing device embedded in manufacturing device. As a non-limiting example, computing device may include a microcontroller, which may be housed in a unit that combines the other components of manufacturing device. Computing device may include a manufacturer client of plurality of manufacturer clients. Computing device may be communicatively connected to a manufacturer client or a plurality of manufacturer clients.

Still referring to FIG. 1A, controller 104 may include a component embedded in bioprinter 100. As a non-limiting example, controller 104 may include a microcontroller, which may be housed in a unit that combines the other components of manufacturing device. Further continuing the example, microcontroller may have program memory, which may enable microcontroller to load a program that directs manufacturing device to perform an automated manufacturing process. Similarly, controller 104 may include any other components of a computing device as described below in a device housed within manufacturing device. In other embodiments, controller includes a computing device that is separate from the rest of the components of manufacturing device 60. For instance, and without limitation, controller may include a personal computer, laptop, or workstation connected to the remainder of bioprinter 100 by a wired or wireless data connection. In some embodiments, controller 104 may include both a personal computing device, where a user may enter instructions to generate a program for turning workpiece into a finished product, and an embedded device that receives the program from the personal computing device and executes the program. Controller may direct elements of bioprinter 100 according to one or more coordinate systems, such as without limitation Cartesian and/or polar coordinates. Persons skilled in the art will be aware of various ways that controller, which may include one or more computing devices, may be connected to or incorporated in an automated manufacturing system, such as bioprinter 100, as described above.

Still referring to FIG. 1A, controller 104 may control components of bioprinter 100. For instance, and without limitation, controller 104 may control elements including, and without limitation, tool changer to switch endmills, spindle, or gear systems operatively coupled to spindle to regulate spindle rotational speed, linear movement of manufacturing tool, base table, or both, and rotation or rotational position of rotary table. As a non-limiting example, controller 104 may coordinate deposition and/or curing of material in additive manufacturing processes, where bioprinter 100 is an additive manufacturing device. Persons skilled in the art, upon reading the entirety of this disclosure, will be aware of similar automated control systems usable for various forms of manufacturing.

Still referring to FIG. 1A, controller 104 may be designed and/or configured to perform any method, method step, or sequence of method steps in any embodiment described in this disclosure, in any order and with any degree of repetition. For instance, and without limitation, controller may be configured to perform a single step or sequence repeatedly until a desired or commanded outcome is achieved. Repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Controller 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1A, bioprinter 100 may include one or more robotic elements, including without limitation, moveable arms, which may be configured to, for example and without limitation, move, rotate, translate, and the like, or otherwise position a workpiece or a manufacturing tool, printer heads, or the like to work on a desired location of the workpiece. In some embodiments, moveable arms may use holonomic constraints. In other embodiments, moveable arms may use non-holonomic constraints. Such printers and components thereof may be as described in U.S. Provisional Application Ser. No. 63/409,345, filed on Sep. 23, 2022, and entitled "ROBOT ARM PRINTER," the entirety of which is incorporated herein by reference.

Still referring to FIG. 1A, bioprinter 100 may include one or more workpiece transport elements for moving workpiece or finished part or component from one manufacturing stage to another. Workpiece transport elements may include conveyors such as screw conveyors or conveyor belts, hoppers, rollers, or other items for moving an object from one place to another. Such transport may be used to transfer an implant or other product or workpiece produced by printer to a bioreactor, and/or to a transport case such as without limitation a transport case as described in U.S. Provisional Application Ser. No. 63/307,562, filed on Feb. 7, 2022, and entitled "TRANSPORT," the entirety of which is incorporated herein by reference.

Further referring to FIG. 1A, Once fabrication of a printed object, such as without limitation an implant and/or angiogenic screw, is completed, the printed object may be transferred to a bioreactor and/or transport case for maturation and/or transfer. Transfer of printed object may be performed, without limitation, via manual, semi-automatic, or automatic processes. In a manual operation, an operator may remove printed object. In a semi-automatic or automatic system, a set of manipulators and/or end effectors may remove a printed object from a build platform and place it within a pre-set container for transfer to an incubation/maturation area and/or to a transport case. Alternatively, a pre-set container may already be part of a bioreactor housing, thereby reducing the number of times the material is handled. A system manipulating a printed object may also include an articulating and/or translating robotic arm. In a semi-automatic operation, an operator may control a transfer. In an automatic operation, a system may perform a transfer autonomously, for instance as controlled by a computing device or the like. Material removal and/or transfer may be performed, without limitation, using a robotic arm, linear and/or rotational actuators, solenoid, stepper motors, or the like.

Still referring to FIG. 1A, a robotic arm may be implemented in any manner as described in this disclosure, including materials incorporated by reference herein. A robotic arm may be implemented as, in a non-limiting example, as a multi-articulated device with motion, such as without limitation a minimum of 6 degrees of motion. Robot arm may have a terminus including a common adapter mechanism; common adaptor mechanism may be configured to fit one or more attachments for activities, such as clamping, grasping, sculpting, lazing, and/or printer head exchange, Transmission of mechanical, fiber, optic, and/or electromagnetic forces, and or signals to this adapter mechanism may be performed. One or more robot arms may be included in an environmental chamber and/or otherwise attached to; adjacent to, incorporated in, and/or combined with bioprinter 100.

With continued reference to FIG. 1A, a clamp attachment may be configured and/or shaped to engage or grasp a transport container. A transport container may include a container such as a pot, a flask, or other item that can hold a print job, workpiece or product produced at printer, such as an implant, an angiogenic screw, or the like. Angiogenic screws may be as described in U.S. Provisional Application Ser. No. 63/306,964, filed on Feb. 4, 2022, and entitled "ANGIOGENIC SCREW," the entirety of which is incorporated herein by reference. Transport container may have slots, projections, or other elements formed to be engaged by a clamp attachment. Clamp attachment may be formed in a complimentary fashion to engage such elements of transport container; for instance, projections or arms of clamp attachment may be formed and/or configured to fit slots in a transport container. Claim may fit specific slots and/or geometry of transport containers into which print jobs may be placed. A similar slot and geometry may be employed for application of a lid, such that a print job such as an implant and the interior container may remain sterile when transported outside of an environmental chamber. A grasping mechanism may be developed for soft materials; for instance and without limitation, a grasping mechanism may have one or more pads of material that is softer than skeletal or structural elements of the grasping mechanism and/or robot arm, where such softer material may include, without limitation, elastomeric materials such as, and/or evincing material properties similar to, medical-grade silicone, rubber, latex, foams made from any of the above materials, or the like. Grasping mechanism may use load and/or pressure sensors as described in this disclosure to detect a force and/or pressure being exerted by grasping mechanism on a workpiece such as an implant, and may compare such force and/or pressure to a preconfigured threshold; controller and/or computing device operating robot arm and/or grasping mechanism may store a plurality of such thresholds for a plurality of types and/or materials of workpieces, such as without limitation a first threshold for a first material type, implant type, or the like and a second threshold for a second material type, implant type, or the like. Grasping mechanism may include an engagement surface that contacts a surface of a workpiece being grasped; engagement surface may have a surface area configured to spread force out over a surface of an implant to reduce surface area pressure. For example, and without limitation such grasping mechanism may have a surface area causing a force (or torque) to pressure ratio comparable, equivalent to, or approximately equivalent to birthing forceps. Preconfigured thresholds may depend on a selection of forceps-like attachments and/or grasping mechanisms; for instance, force thresholds may be greater for a grasping mechanism with a higher force to pressure ratio.

Still referring to FIG. 1A, a laser attachment may be configured to generate specific energies and/or wavelengths to accomplish sculpting, curing, and/or laser sintering on polymeric, bioceramic, and other materials. For instance, subtractive processes using a laser attachment may be used for modification of an angiogenic screw, a bioceramic component of an implant, or the like, permitting such print job products to have and/or be formed with specific surface properties and/or other electromagnetic characteristics.

Still referring to FIG. 1A, the laser attachment may be replaced with a different light source that may use a fiber optic, UV light, infrared transmission of light at different wavelengths, not limited to but inclusive of the entire light spectrum.

With continued reference to FIG. 1A, a print cartridge exchange extension may have capacity to place and/or remove printer cartridges from arc tracks, and/or to move them between arc tracks and storage bays, containers, disposal containers, or the like, which may be located elsewhere in an environmental chamber, at printer, or the like. A mechanism for lifting, releasing and locking and un-locking a print head from its location in a storage bank, arc-track and other locations may ensure proper and consistent print head exchange.

Still referring to FIG. 1A, an implant manipulator may be configured to lift, rotate, flip and/or otherwise manipulate an implant of any material through 2 or more extensions with force sensing and one or more grip planes that can adjust independently to the geometry of the implant.

Further referring to FIG. 1A, a robotic arm may also be outfitted with one or more additional attachments for performing additive or subtractive manufacturing steps, and/or one or more intermediate washing, curing, or other steps, for instance and without limitation by emitting jets of water, solvents, gases or powders from nozzles or other applicators. Robot arm attachments may be configured to supply vacuum, for instance to vacuum water, solution and/or material aspiration. These and other features may be useful for mounding, surface modification, removal of unwanted material, or the like.

Still referring to FIG. 1A, robot arm or similar device may have one or more sensors attached thereto. One or more sensors may include without limitation any sensor or sensors as described in this disclosure. One or more sensors may include, without limitation, sensors such as rotary encoders, linear displacement sensors, and/or IMUs or components thereof, as described herein, to detect robot arm, position and/or angel at every joint, or the like. Sensors may detect a position of an arm attachment relative to and/or within an environmental chamber or other location where an arm attachment is anchored and/or stowed; this may be achieved using "dead reckoning" with position sensors, and/or using an optical sensor such as a camera or the like, a magnetic sensor, or any other sensor that may occur to persons skilled in the art upon reviewing the entirety of this disclosure. Sensors may include a camera and/or fiber optic to observe action at a point such as where attachment is engaging with a workpiece and/or where robot arm is engaging with attachment. Optical tracking, using 2 or more cameras, in a chamber such as environmental chamber may be used to confirm position and movement of one or more objects therein, including robot arm, attachments, workpieces such as implants and/or angiogenic screws, or the like. For gripping, load sensors may be deployed at each "gripping pad" for pressure and displacement; a controller of robot arm may be configured to stop augmentation of pressure and/or release pressure if a load sensor reading is above a preconfigured threshold; this may be done so that soft implant and/or DFFA, as described in further detail below, and or any other auxiliary materials are not destroyed.

Further referring to FIG. 1A, a transport mechanism such as a robot arm may insert each workpiece into a unique pod, bioreactor, and/or transport case as described in this disclosure.

Still referring to FIG. 1A, additive manufacturing may include deposition of initial layers on a substrate. For the purposes of this disclosure, a "substrate" is a support surface of an additive manufacturing device, or a removable item placed thereon that initial layers of additive manufacturing process may be applied to during construction. In various embodiments, substrate may include a base plate 108 (also shown in FIG. 1C), which may be constructed of any suitable material. For instance, and without limitation, substrate may include a base plate 108, which is composed of, for example and without limitation, a metal, metal alloy, such as titanium, ceramic, and the like. In various embodiments, base plate 108 may be removable from the remainder of bioprinter 100. For instance, and without limitation, base plate 108 may be selectively attached to bioprinter 100. In various embodiments, base plate 108 may be moved by controller 104. For example, and without limitation, base plate may be rotated, translated, or any other movement relative to a center point of bioprinter 100, a discussed further below in this disclosure.

Still referring to FIG. 1A, in one or more embodiments, one or more support features may also be used to support additively manufactured body of material during additive manufacture. For instance, and without limitation, where a downward-facing surface of additively manufactured body of material is constructed having less than a threshold angle of steepness, support structures may be necessary to support the downward-facing surface. In a non-limiting embodiment, threshold angle may include, for example and without limitation, 45 degrees. In various embodiments, support structures may be additively constructed, and support structure may be supported on support surface and/or on upward-facing surfaces of additively manufactured body of material. Support structures may have any suitable form, including, but not limited to, struts, buttresses, mesh, honeycomb, or the like. Persons skilled in the art, upon reviewing the entirety of this disclosure, will be aware of various forms that support structures may take consistently with the described methods and systems.

Still referring to FIG. 1A, bioprinter 100 may include one or more applicators or other additive devices and/or components. For instance, and without limitation, bioprinter 100 may include an applicator such as a printhead 108. In one or more embodiments, bioprinter 100 may include an extruding device for extruding fluid or paste material, a sprayer or other applicator for bonding material, an applicator for powdering, a sintering device such as a laser, or other such devices and/or components. In one or more embodiments, during an additive manufacturing process, printhead 112 may be configured to deposit material onto base plate 108 to create a desired object or result, such as workpiece 116 (shown in FIG. 1C). In several embodiments, bioprinter 100 may include a one or more printheads 108. For instance and without limitation, bioprinter 100 may include a first printhead 112a, a second printhead 112b, and a third print head 112c, as discussed further in this disclosure. For the purposes of this disclosure, a "printhead" is a device that includes the output or input of the bioprinter, where output is configured to deposit material to create a desired object during additive manufacturing and input is configured to remove material of a desired object during subtractive manufacturing. Printhead 112 may include components, such as an extruder, nozzle, reservoir, motor, control gauge, controller, and the like, as discussed further in this disclosure.

Still referring to FIG. 1A, bioprinter 100 may include one or more arcuate tracks 116. For the purposes of this disclosure, an "arcuate track," which may alternatively be referred to herein as an "arc track," is a track with a curvature of k that a printhead is moveably attached to and may traverse along. Curvature may be substantially circular, semicircular, or arcuate. Alternatively or additionally, curvature may be elliptical, parabolic, or any other curve or combination of curves. In various embodiments, arcuate tracks may have different k values so that arcuate tracks 116 may be concentric. In various embodiments, track mays be a distance d apart to allow for clearance of printheads 112 to traverse between tracks 116. The distance d between each arcuate track may be the same or may be different. In some embodiments, one printhead 112 may travel along a corresponding arcuate track 116. For example, and without limitation, printhead 112a may travel along arcuate track 116a, printhead 112b may travel along arcuate track 116b, printhead 112c may travel along arcuate track 116c, and so on. In other embodiments, a plurality of printheads may travel along the same arcuate track. As understood by one skilled in the art, though the exemplary embodiments show three printheads and three arcuate tracks, any number or printheads or arcuate tracks may be used in bioprinter 100. As a further non-limiting example, there may be 2 to 9 different arc tracks. Each arc track may be able to rotate around the base or from an alternative reference. Each arc may, in some non-limiting examples, be able to hinge to flatten down into a plane level with a hinge that rotates the arc track through the vertical. A number of arcs and/or printheads may be determined by, for example and without limitation, a number of materials to be printed. Printheads employed may be of a number and type suited for different biomaterial deposition specified by a number of material types to be printed in order to fabricate structures, scaffolds, and tissues from one or more materials of one or more objects. There may be a specific focus on multi-tissue printing where inclusion and printing of an internal vascular network is employed and/or may be necessary. Printheads for such a purpose may travel along arcs and a deposition nozzle or needle of printhead may extend and/or retract towards print bed, which may be centered within a concentric arc track system that may translate in various directions, rotate, and rock, as discussed further below in this disclosure, which may allow rapid, accurate deposition of materials of many types onto an int build all for the purpose of generating implants with a maximized capacity to successfully integrate into the body in a functional manner. Such implants may be as described in U.S. Provisional Application Ser. No. 63/409,363, filed on Sep. 23, 2022, and entitled "IMPLANT," the entirety of which is incorporated herein by reference. Print-heads may include thicker needles for more viscous, lumpy material, for instance and without limitation for extrusion and/or deposition of materials usable in printing alternate living tissue components, such as chondrocytes and matrix material for cartilage regeneration, or the like.

Still referring to FIG. 1A, bioprinter 100 may include one or more printheads 112 for processes, including, and without limitation, photocrosslinking, chemical crosslinking, and/or or thermal crosslinking of components and/or materials. Bioprinter 100 may move printheads 112 according to a plurality of different motion capabilities. For instance, and without limitation, each printhead 112a-c may be configured to glide along arcuate tracks 116a-c, respectively. In various embodiments, arcuate tracks 116 may be nested relative to each other. For example, and without limitation, arcuate tracks 116a-c may be concentric and share the same center point. In one or more embodiments, arcuate track 116 may in include an arc-shaped track, such as a semicircular or U-shaped track, where printhead 112 may travel, for example and without limitation, 180 degrees about a workpiece 168 (shown in FIG. 1C) along arcuate track. In another instance, and without limitation, arcuate track 116 may include a circular track, where printhead 112 may travel 360 degrees about an object along arcuate track, as discussed further in FIG. 2.

Figure 1B:
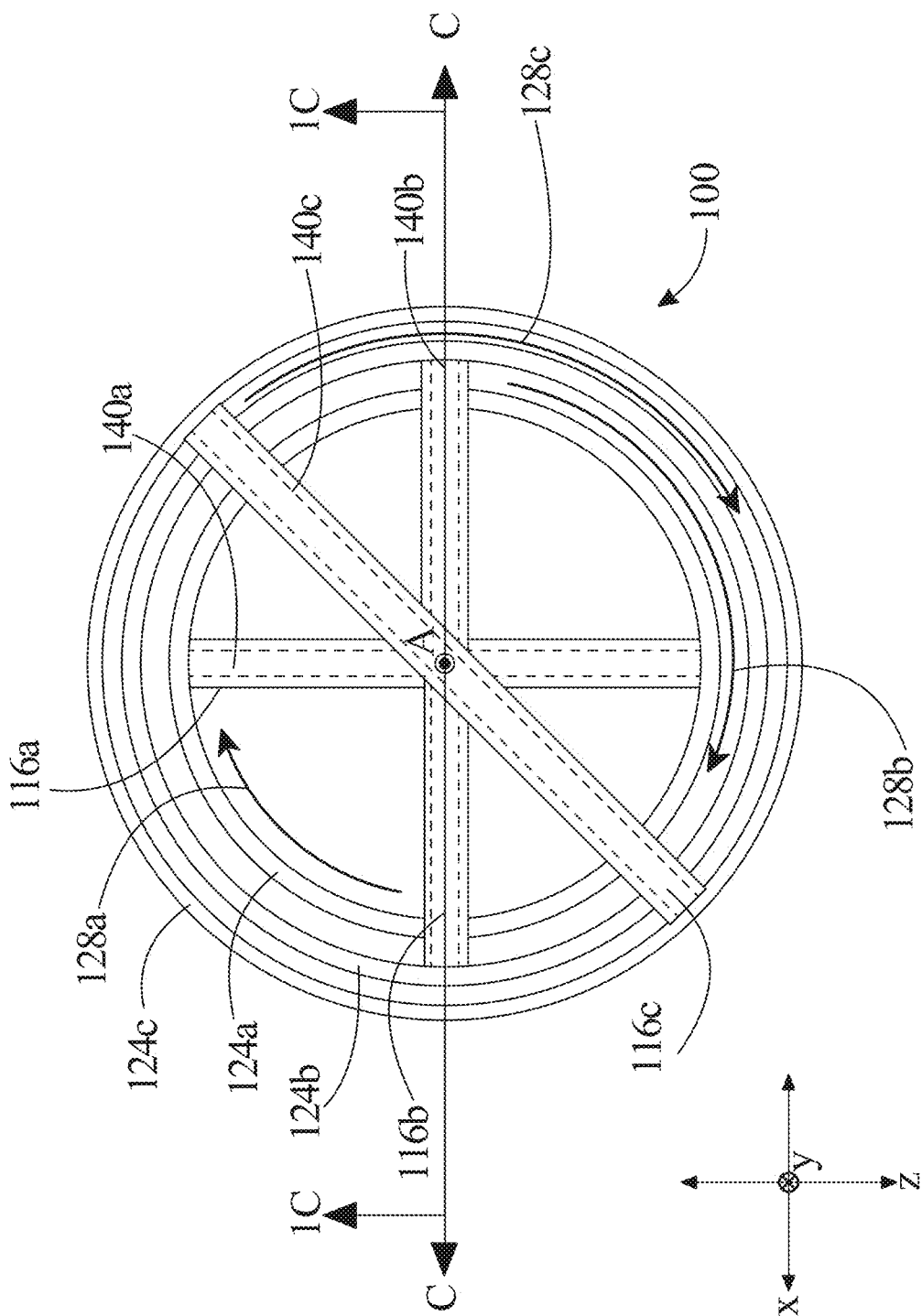

Now referring to FIG. 1B, a top view of bioprinter 100 is shown in accordance with one or more embodiments of the present disclosure. Bioprinter 100 may include a frame 120. Frame 120 may include one or more concentric orbital rings 124a. For the purposes of this disclosure, a "frame" is a base that arcuate tracks are attached to. Frame 120 may include concentric orbital tracks 124a-c, each of with may be rotated about central axis A of bioprinter 100 and within plane of frame B. For the purposes of this disclosure, a "concentric orbital track" or "orbital track" is a moveable band connected to an arcuate track, where arcuate track moves relative to orbital track during operation of bioprinter 100. In one or more embodiments, concentric orbital track 124 may facilitate rotation of arcuate track 116 along a horizontal plane, or circumference of orbital track 124, as indicated by arrows 128. Arcuate tracks 116a-c may each be raised or lower in elevation with respect to center point (0,0) of bioprinter using concentric orbital tracks 124a-c, respectively. For example, and without limitation, orbital tracks 124a-c may translate in a direction along y-axis to vary an elevation of a corresponding arcuate track 116a-c. For the purposes of this disclosure, a "center point" or "origin" of bioprinter is a point where vertical axis A (i.e. central axis of bioprinter parallel to the y-axis) and horizontal axis C (i.e. central axis of bioprinter parallel to the x-axis) of bioprinter intersect. In several embodiments, each arcuate track 116a-c may be configured to rotate about base plate 108 (e.g., print bed and/or substrate), and/or a printed or partially printed workpiece which may be on the substrate, independently along concentric orbital tracks 124a-c as indicated by directional arrows 128a-c, respectively. For example, and without limitation, each arcuate track 116a-c may rotate 360 degrees about base plate 108, where each arcuate track 116a-c may rotate about a central axis A of bioprinter 100. Each arc track may be able to rotate on its hinge through a great circle orthogonal to its track, through a horizontal axis. Arc tracks may be able to rotate around a print bed through a vertical axis. Each arc track may be capable of moving through one or more degrees of freedom independently from each other arc track.

Figure 1C:
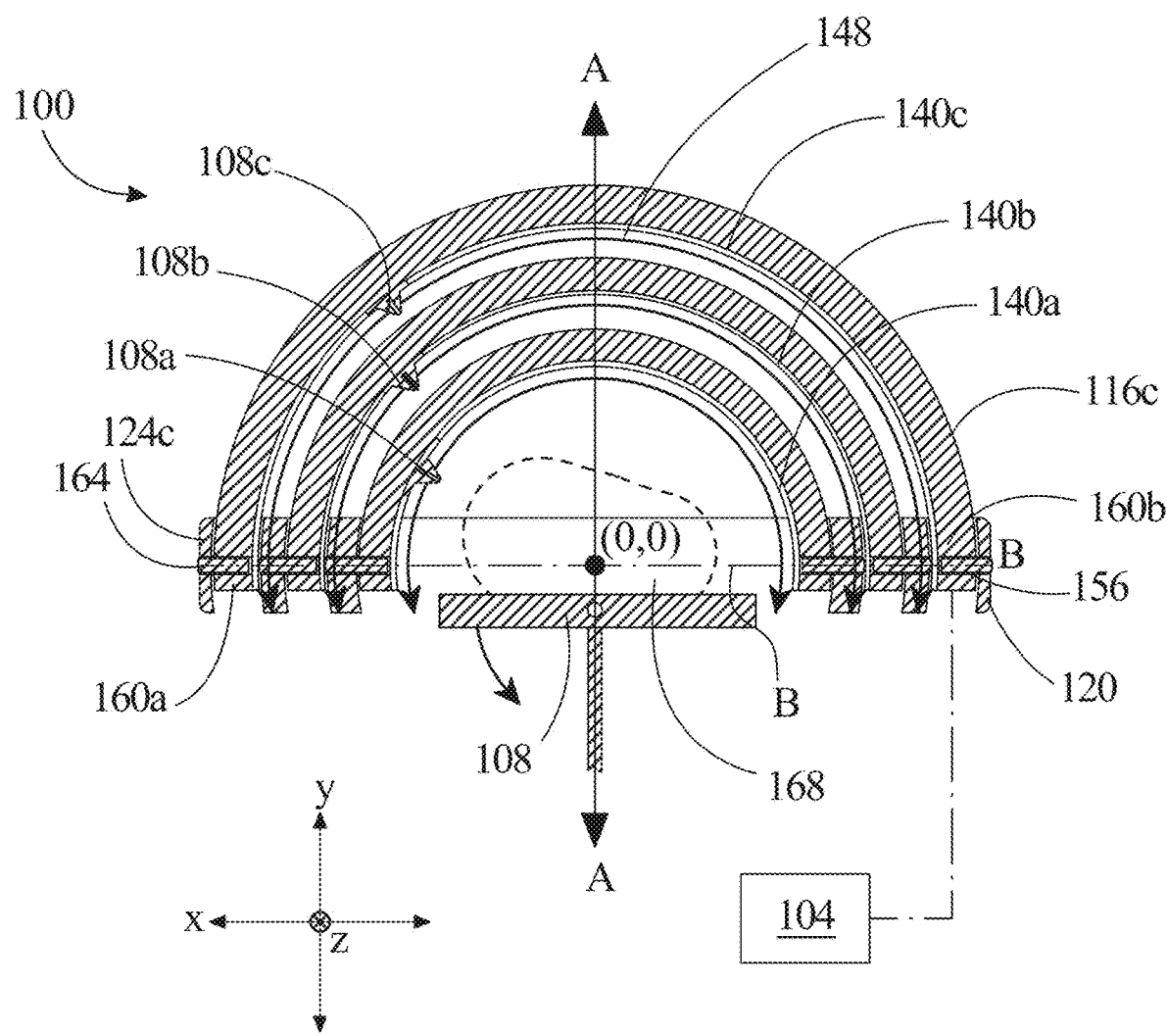
Figure 2:
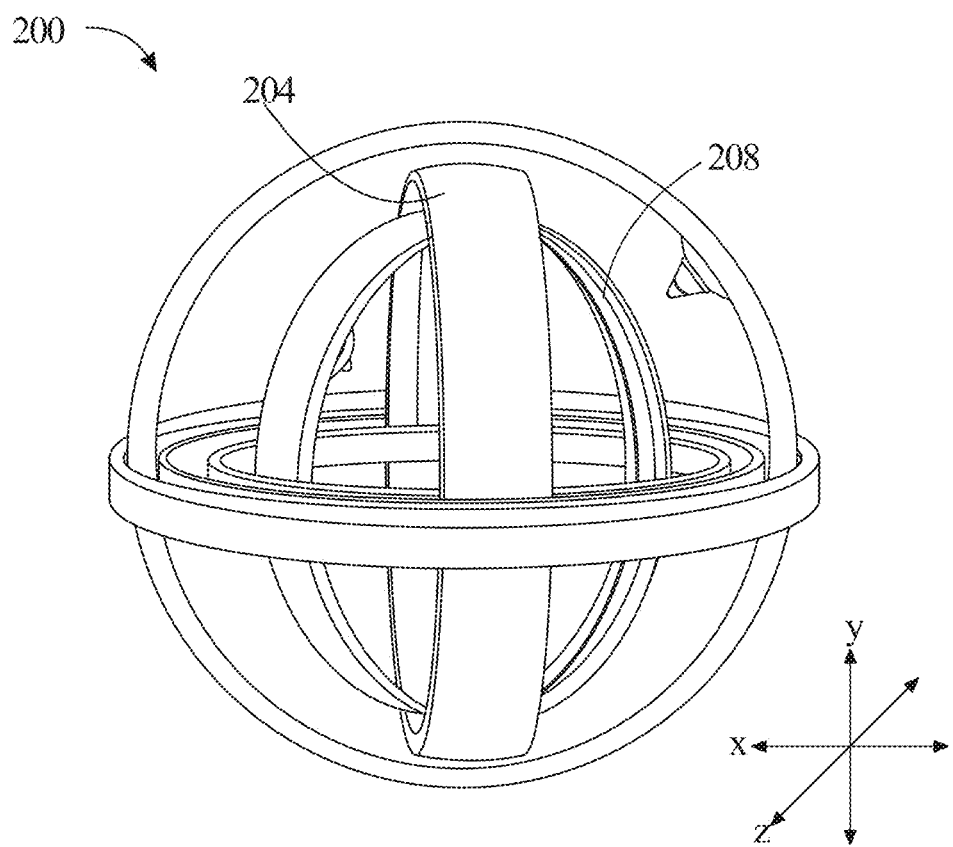
FIG. 2 is a schematic diagram illustrating a perspective view of a second exemplary embodiment of a bioprinter in accordance with one or more embodiments of the present disclosure.

Now referring to FIG. 1C, a front cross-sectional view of bioprinter 100 taken along line 1C-1C of FIG. 1B is shown in accordance with one or more embodiments of the present disclosure. In one or more embodiments, each arcuate track 116a-c may be configured to pivot about one or more rotational joints 132 and thus rotate about horizontal axis C of bioprinter 100, as indicated by directional arrow 136, which shows the pivoting of arcuate track 116b about a corresponding rotational joint (shown in FIG. 1A). In one or more embodiments, bioprinter 100 may include a vertical axis A, which is orthogonal to a plane B of a frame 120, as previously mentioned in this disclosure. In one or more embodiments, each arcuate track 116a-c may include a groove 140a-c, respectively. In some embodiments, arcuate track may include a 180-degree groove, as shown in FIGS. 1A-1C. In other embodiments, arcuate track may include a 360-degree groove, as shown in FIG. 2. Printhead 108 may move along groove 140 of arcuate track 116 using a linear motor system or other mechanisms, as discussed further below.

Still referring to FIG. 1C, arcuate track 116a-c may include nested, concentric tracks, such as first arcuate track 116, second arcuate track 116b, third arcuate track 116c, and so on, each of which include a first groove 140a, second groove 140b, third groove 140c, respectively, and so on. A "groove," for the purposes of this disclosure, includes a recessed region disposed within arcuate track. Grooves may include biasing surfaces that complementary abutment surfaces of printhead may engage to allow for printhead 112 to be slidably connected to arcuate track 116.

Printheads 112a-c may include engagement members configured to slidably attach to grooves 140a-c, respectively. Engagement members of printheads 108a-c may each include complementary shaped protrusions, such as and without limitation, protrusions with T-shaped cross-sections, which may be received by grooves 140a-c. In other embodiments, instead of grooves, arcuate tracks may include elongated protrusions that run the length of arcuate tracks. Such protrusions may include, for example and without limitations, T-shaped cross-sections. Printhead 112 may include an engagement member that includes a complementary surface for slidably attaching printhead to arcuate track. For instance, and without limitation, engagement member of printheads may be configured to receive at least a portion of protrusion.

Still referring to FIG. 1C, for the purposes of this disclosure, the center of bioprinter 100 is considered the center of the frame of reference (i.e. origin or center point of (0,0). Orientation and/or position of base plate 108 of bioprinter 100 may be expressed with respect to a given coordinate system (e.g., Cartesian or polar coordinate system). In some embodiments, movements and/or positions of bioprinter 100 may be described within a Cartesian coordinate system, where the Cartesian coordinate system includes an x-axis, y-axis, and z-axis. For example, and without limitation, comparing two or more positions of components of bioprinter 100 may be described as a function of a Euclidean distance. In other embodiments, movements and/or positions of bioprinter 100 may be described within a polar coordinate system, where the polar coordinate system includes at least a point and a polar axis. For example, and without limitation, comparing two or more positions of the same component or between different components of bioprinter 100 may be described as a function of one or more angles. For example, and without limitation, angle φ may correspond to the finite rotation of a varying orientation of a component over time (e.g., arcuate track, concentric track, base plate, and the like). The varying orientation may include, for example and without limitation, two positions such as a first position and a second position of the component. In some embodiments, bioprinter 100 may use holonomic or position-based paths that are defined within a Cartesian coordinate space of, for example, a moveable arm and correspond to a desired movement of one or more joints of the moveable arm, as previously mentioned in this disclosure. Cartesian coordinate space may be defined as a space of positions and/or orientations within any desired control frame. A control frame may be the center point of bioprinter 100.

Still referring to FIG. 1C, bioprinter 100 may include one or more mechanisms that facilitate movement of arcuate tracks 116a-c, such as a rotational joints 156. For the purposes of this disclosure, a "rotational joint" is a mechanism or connector that allows rotary movement about a single point. In one or more embodiments, frame 120 and arcuate tracks 116 may be mechanically attached using rotational joints 156. Rotational joint 156 may allow rotary movement of ends of each arcuate track about a single point, such as a pivot point 164, so that arcuate track may rotate about a corresponding horizontal axis D, such as horizontal axis D1, D2, D3 of arcuate tracks 116a, 116b, and 116c, respectively. For example, and without limitation, each end 160 of arcuate track 116, which is attached to rotational joint 156, may rotate about corresponding pivot point 164 so that arcuate track 116 in its entirety may rotate about center point (0,0) of bioprinter 100. In one or more embodiments, arcuate track 116 may be pivotably attached to rotational joint 156. For example, and without limitation a pin or screw may mechanically connect end 160 of arcuate track 116 to rotational joint 156, where pin or screw may be disposed within a bore of end 160 to create pinto point 164. In various embodiments each end 160a,b of arcuate track 116 may be attached to rotational joint 156a,b, respectively. For example, and without limitation, a first end 160a of arcuate track 116c may be attached to a first rotational joint 156a, and a second end 160b of arcuate track 116c may be attached to a second rotational joint 156b. As previously mentioned, arcuate track 116 may pivot about rotational joints 156a,b such that arcuate track 116 may rotate about a horizontal axis D3 of arcuate track 116c. Such movement allows printhead 112 to be desirably positioned relative to base plate 108 and workpiece 168. In a non-limiting example, arcuate track 116a may be rotated about pivot points so that arcuate track 116a is tilted from a 90-degree angle to a 10-degree angle relative to a plane B of frame 120, where plane B may include a plane oriented along an azimuth of bioprinter 100. In one or more embodiments, a motor attached to rotational joint may power movement of arcuate tracks 116.

A "motor", for the purposes of this disclosure, is a device that converts electrical energy into mechanical movement. Motor may be disposed within or attached to frame 120. Motor may include, without limitation, any electric motor, where an electric motor is a device that converts electrical energy into mechanical energy, for instance by causing a shaft, such as rotor shaft, to rotate. In one or more embodiments, motor may be driven by direct current (DC) electric power. For instance, motor may include a brushed DC motor. In various embodiments, motor may include, without limitation, a brushless DC electric motor, a permanent magnet synchronous motor, a switched reluctance motor, stepper motor, servo motor, and/or an induction motor. In other embodiments, motor may be driven by electric power having varying or reversing voltage levels, such as alternating current (AC) power, which may be produced by an alternating current generator and/or inverter or by a switching power source. Persons skilled in the art, upon reviewing the entirety of this disclosure, will be aware of various alternative or additional forms and/or configurations that motor may take or exemplify as consistent with this disclosure. In one or more embodiments, motor may be part of a motor assembly, which may also include an inverter, a switching power source, a circuit driving and/or controlling motor, electronic speed controllers, or other components for regulating motor speed, rotation direction, torque, and/or braking. In one or more embodiments, controller may be configured to control and/or operate motor.

Still referring to FIG. 1C, bioprinter 100 may include one or more sensors. As used in this disclosure, a "sensor" is a device that is configured to detect an input and/or a phenomenon and transmit information related to the detection. For instance, and without limitation, sensor may detect a user input. User input may be from an operator control, such as an input into a graphical user interface of controller and/or computing device. In one or more embodiments, information detected by sensor may be transmitted in the form of an output sensor signal. Sensors may be communicatively connected to, for example, motor or tracks. Controller may include or be communicatively connected to one or more sensors, which may detect one or more conditions of bioprinter and/or components thereof. One or more conditions may include, without limitation, position of printheads, tracks, or motor components, current levels, voltage levels, electromotive force, temperature of motors or power sources, current speed of rotation of arcuate tracks or printheads, and the like. For instance, and without limitation, one or more sensors may be used to detect position, or to detect parameters used to determine position, as discussed further in this disclosure. In various embodiments, one or more sensors may include a plurality of current sensors, voltage sensors, speed, or position feedback sensors, and the like. Sensor may communicate a current status of components of bioprinter to controller and/or a computing device. In one or more embodiments, controller may use sensor feedback to calculate performance parameters of components of bioprinter, such as printheads, tracks, motors, and the like.

Still referring to FIG. 1C, sensor may detect a plurality of characteristics related to bioprinter and/or bioprinter system. For example, and without limitation, characteristics of bioprinter that may be detected by sensor may include position, orientation, voltage, current, speed, pressure, and the like. In one or more embodiments, and without limitation, sensor may include one or more temperature sensors, voltmeters, current sensors, hydrometers, infrared sensors, photoelectric sensors, motion sensors, pressure sensors, radiation sensors, level sensors, imaging devices (e.g., visible spectrum or infrared imaging devices), moisture sensors, gas and chemical sensors, electrical sensors, imaging sensors, force sensors, Hall sensors, speed sensors, and the like. Sensor may be a contact or a non-contact sensor. For example, and without limitation, sensor may be directly connected to bioprinter and/or a component thereof. In other embodiments, sensor may be remote to bioprinter and/or a component thereof. Sensor may be communicatively connected to controller so that sensor may transmit/receive signals to/from controller, respectively. Signals, such as signals of sensor and controller, may include electrical, electromagnetic, visual, audio, radio waves, or another undisclosed signal type alone or in combination. As used herein, "communicatively connected" is a process whereby one device, component, or circuit is able to receive data from and/or transmit data to another device, component, or circuit. In an embodiment, communicative connecting includes electrically connecting at least an output of one device, component, or circuit to at least an input of another device, component, or circuit.

With continued reference to FIG. 1C, print heads may include one or more sensors. One or more sensors may include any sensors described in this disclosure. One or more sensors may include one or more sensors mounted within a nozzle, such as without limitation rate and/or temperature sensors. One or more sensors may include one or more sensors within a reservoir of print head, such as without limitation sensors to detect a sensor and/or a volume of material within printer; volume sensor may operate, without limitation, by detecting a displacement of an extrusion mechanism deployed within reservoir and/or print head. One or more sensors may include sensors to detect location and/or angle of print head and/or arc track. A mixing mechanism may be included in the reservoir, such as a stir bar or the like; a sensor such as a rotary encoder or the like may operate to detect a speed of rotation of such mixing mechanism. An optical sensor may be operable and/or configured to detect fluid flow (viscosity), opacity, turbidity, or the like; any other rheometer may be used to measure viscosity. One or more sensors may include and/or be connected to a microfluidics system, which may enable detection that a malfunction is occurring, for instance because an air bubble may be detected. Detection that a cartridge and/or reservoir is empty may be accomplished by detecting electrical properties of the needle to indicate backup of bioceramics therein.

Still referring to FIG. 1C, printheads 112a-c may move along a path, such as paths 148a-c, respectively, along corresponding arcuate tracks 116a-c. For the purposes of this disclosure, a "path" may include a current trajectory or available trajectory of a component of bioprinter 100. A component may be translated of modified along path to alter a position and/or orientation of component, such as printhead 112, within a space. For instance, and without limitation, a path may include a displacement of a component of bioprinter 100 within Cartesian-coordinate space. In one or more embodiments, a component of bioprinter 100 may be displaced through translational and/or rotational movements of component of bioprinter 100. Movement of a component of bioprinter 100, such as printhead 112, nozzle of printhead 112, arcuate tracks 116, or orbital tracks 124, and the like, component may move from a first position to a second position using one or more motions. For example, and without limitation, printhead 112 may travel from a first position to a second position by moving along arcuate track 116 along an arcuate path. Position may be directed and/or detected, without limitation, using polar coordinates, Cartesian coordinates, or the like.

Figure 1D:
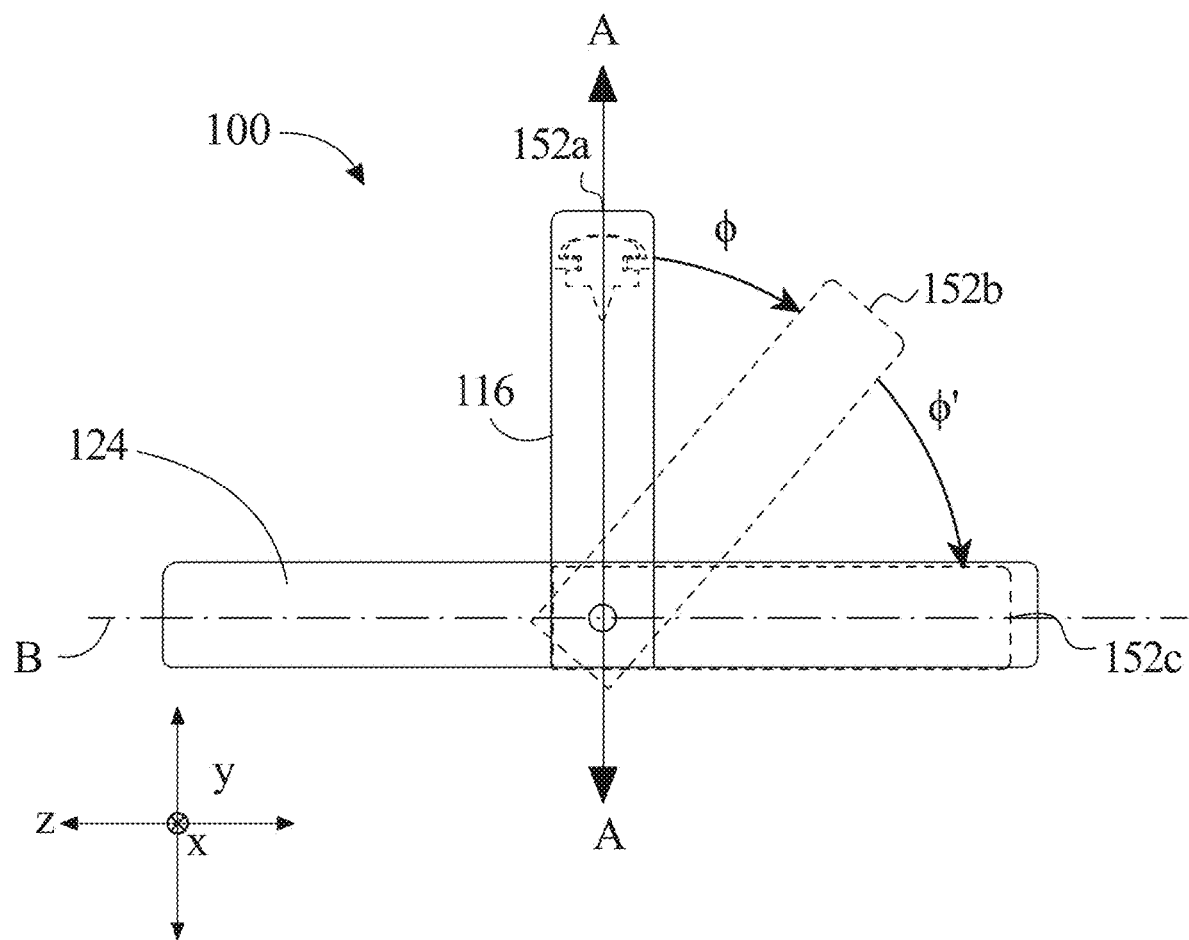

Now referring to FIG. 1D, a side view of exemplary embodiment of bioprinter 100 is shown in accordance with one or more embodiments of the present disclosure. In some embodiments, the movement of a component of bioprinter 100 may be described in polar coordinates, where a projection of a component's position onto the xyz-plane is determined by its distance from the axis of rotation (starting a point of origin of (0,0) with angle of its radius-vector to abscissa ($\phi$; $\phi'$). For instance, and without limitation, a position of arcuate track 116 may change from a first position 152a at, for example, 90 degrees to a second position 152b at, for example, 45 degrees to a third position 152c at, for example, 0 degrees. First angle $\phi$ may include 45 degrees between first position 152a and second position 152b, and second angle $\phi'$ between second position 152b and third position 152c may include 45 degrees.

Still referring to FIG. 1D, in some embodiments, a base plate 108 (also referred to in this disclosure as a "print bed" or "build plate") may include capabilities to rotate axially with respect to arcuate tracks and/or orbital tracks. For example, and without limitation, base plate 108 may move horizontally with respect to frame 120 of bioprinter 100. In another example, and without limitation, base plate 108 may move vertically with respect to frame 120 of bioprinter 100. In another example, and without limitation, base plate 108 may move rotationally around any axis with respect to frame 120 of bioprinter 100. In another example, and without limitation, base plate 108 may allow 6 degrees of freedom (DOF) for printheads 112a-c, facilitating access of printheads 112a-c to any portion on a fabricated part (e.g., workpiece 168) with any predetermined trajectory or path. Consequently, material may be added on any surface and even into an open cell micro-architecture after other materials have already been printed. A build volume may be environmentally flexible for rapid adjustments of its settings to ideal parameters for example thermal crosslinking as well as printing of organic material. After an initial fabrication of the scaffold, bioprinter may fabricate a custom-designed manifold matching outer contours of an implant of biocompatible but inert polymers around the scaffold; this may be performed without limitation as described in further detail below. This final envelope around the scaffold may establish a unique environment which may subsequently be used in a bioreactor. In some embodiments, printer may include a multi axial build plate; this may allow for translation and/or rotation in four axes. Multi axial build plate may allow for printing on and/or through materials that have already been printed from five sides (excluding an adhered surface). Multiaxial build plate may allow for very finite and ornate and particular printing, and/or for filling of void space after materials have been printed.

Still referring to FIG. 1D, during deposition, cells deposited may be alive. Once deposited, such cells may need a medium to provide one or more nutrients to keep the cells alive; such medium may include a natural or artificial nutrient medium. In an embodiment, a bath of such media may be located in a portion of environmental chamber, permitting immersion and/or periodic dipping of a workpiece therein to provide such nutrients. For instance, and without limitation, a bath may be located in a bottom portion of environmental chamber; base plate may be configured to lower into bath as successive layers are added, so that completed portions of a workpiece are immersed while new layers are added. Print bed may be configured to lower further into bath periodically to "dip" workpiece and further saturate cells and/or vascular and/or vascularized paths with media. Print bed may be raised and/or lowered according to linear up-down coordinates, for instance on completion of a layer; in some embodiments, a routine controlling the printheads may be agnostic to a vertical position of printhead, and may receive a signal, to start and/or stop layer deposition from a routine and/or component controlling print bed position.

Still referring to FIG. 1D, in some embodiments print bed may be configured to flip over, inverting with workpiece into a bath, which may include a nutrient bath and/or a separate resin bath that coats workpiece with resin; resin may fill a container to a certain height and/or may have a layer of liquid resin that floats on top of another liquate such as water or the like, where floating layer may have a prescribed and/or measured thickness, which may dictate a thickness of a resulting resin coating.

In some embodiments, and continuing to refer to FIG. 1D, when printing an implant, implant may have a printed vascular tree using one or more layers of printable materials such as hydrogels, cell combinations, growth factors, ECM, and any combination of such and a bony material such as calcium aluminate; this vascular tree may include a large number of little branches analogous to capillary structures that extend into a top portion of a nearly completed implant. Printer may then switch to a cartilage mode wherein printer deposits a lattice work where the mineralization transition can be made more smoothly or naturally a subsequently deposited cartilage layer. In some embodiments, vasculature so generated may allow medium to reach within the implant, so no part of cell culture is less than 200 microns from the medium.

Still referring to FIG. 1D, printer may print an outer layer around an implant known as a dynamic fluid force adaptor (DFFA). A DFFA may be a structure that extends around the implant when finished; DFFA may more or less completely envelop implant. DFFA may be constructed of elastomeric materials and/or other elastic materials, such as but not limited to thermoplastics or PVA and similar polymers; such materials may be deposited, without limitation, using fused deposition, powder-jet deposition, laser sintering, or any other suitable process. In an embodiment, materials making up DFFA may be elastic enough to respond to the hydrostatic load. DFFA may be deposited in adjacent layers that are not permanently stuck together; such layers may, for instance, be adhered together by a lattice or other layer of brittle material that will break when fluid or gas is injected between the DFFA layers, allowing them to inflate analogously to a balloon—DFFA may be able to expand, for instance when inflated with fluid and/or gas and maintain a pressure, functioning analogously to a balloon and/or sock around the implant. DFFA may fill with hydrostatic pressure to load bone and/or cartilage of implant with pressure and mature them. Meanwhile, the medium may be pumped to flow through vascular tree to feed the tissues and keep them alive. After depositing all layers of an implant bioprinter 100 may print DFFA material on top of implant; a robot arm or other mechanism, and/or a person operating tongs or the like may flip, permitting bioprinter 100 to deposit more DFFA material, such as double-layers on an underside of implant. Alternatively or additionally, DFFA materials may be deposited on the print bed prior to printing implant.

Still referring to FIG. 1D tubes may be 3d printed along with implant and DFFA. Printing may be performed so that such tubes extend to preset positions around implant. Tubes may be formed with a tapering or funnel shape on the outside of the DFFA that will inflate onto stiff nozzles of a bioreactor. DFFA may be printed with a honeycomb structure within it to keep it in a certain shape, permitting creation of a shape correctly—honeycomb may be destroyed later to permit greater elasticity of DFFA as described above. An outer hard polymer, not limited to an acrylic/lexane layer may be deposited, printed, and/or coated around DFFA. Now referring to FIG. 2, a perspective view of a second exemplary embodiment of bioprinter 200 is shown in accordance with one or more embodiments of the present disclosure. In one or more embodiments, arcuate tracks 204 may include circular arcuate tracks that allow have grooves 208 that traverse 360 degrees about center point of bioprinter.

Figure 3:
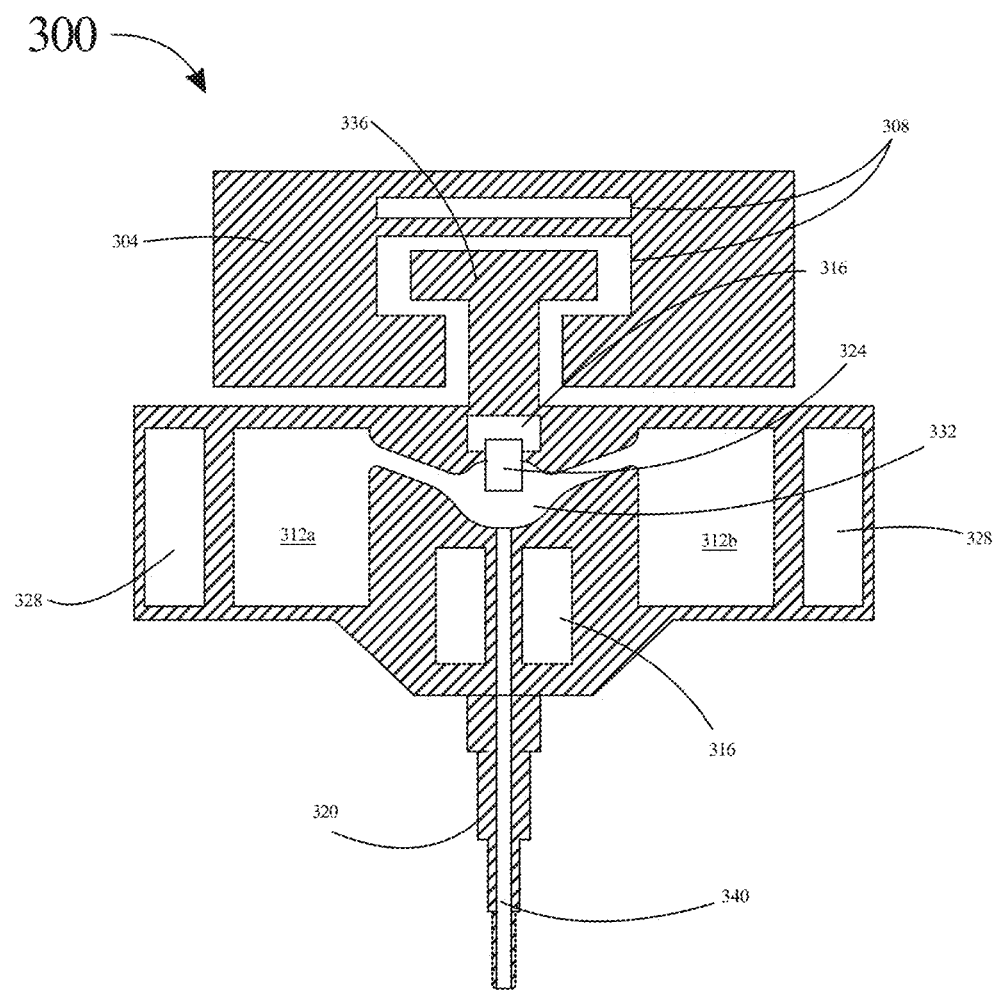
FIG. 3 is a schematic diagram illustrating a perspective view of a first exemplary embodiment of a printhead in accordance with one or more embodiments of the present disclosure.

Now referring to FIG. 3, an exemplary embodiment of printhead 300 moveably attached to arcuate track 304 is shown in accordance with one or more embodiments of the present disclosure. In one or more embodiments, printhead 300 may include a linear motor system 308, one or more reservoirs for print materials such as reservoirs 312a,b, a motor 316 to control extension and/or retraction of a nozzle 320 of printhead 300 (e.g., telescoping nozzle) for extrusion of materials and/or to control environmental conditions such as for example, temperature, humidity, gas flow, light, polymerization chemicals, and the like, one or more mixing mechanisms 324, an environmental control 328 for controlling environmental conditions of mixing chambers and/or reservoirs, antechamber 332 (i.e. mixing chamber), engagement member 336, and the like.

Still referring to FIG. 3, in some embodiments, nozzle 332 may include one or more telescoping nozzles. For the purposes of this disclosure, a "telescoping nozzle" or "retractable nozzle" is a nozzle configured to extend or retract along a longitudinal axis of nozzle such that an outlet of nozzle may approach or recede, respectively, from a print surface and/or workpiece. Such adjustability of nozzle length allows for maximum print resolution and for nozzle to be able to print on any location of base plate and/or workpiece. Nozzle 332 may include a nozzle configured to extend toward or retract away from a print surface and/or object. In other words, nozzle 332 may retract or extend relative to a base of printhead 300, where base of printhead is moveably attached to arcuate track, as previously described in this disclosure. Nozzle 332 may include a needle and/or an elongated, hollow shaft. In other non-limiting embodiments, the entirety of printhead 300 may extend toward implant instead of just nozzle 332. For instance, and without limitation, engagement member of printhead may remain engaged with groove while a body of printhead may be moved away from groove and engagement member by an expandable mechanism. Expandable mechanism may include a linearly expandable mechanism, such as a collapsible hook and loop connection system (e.g., scissor-action mechanism with interlocking bars). Expandable mechanism may be attached to a surface of engagement member and an opposing surface of body of printhead. Nozzle 332 may include a longitudinal lumen 340, as previously discussed, disposed therein that extends along a length of nozzle (e.g., lumen shares a central longitudinal axis B with nozzle), where printing material may traverse from a reservoir 312, through lumen 340, and onto a printing object and/or surface.

Still referring to FIG. 3, in one or more embodiments, nozzle 320 of printhead 300 may include a lumen 340. A "lumen", for the purposes of this disclosure, is a hollow tube that extends the length of nozzle. Print material may be transferred from one or more reservoirs 312a,b, through lumen 340, and onto a base plate to deposit a material onto workpiece. Nozzle 320 of printhead 300 may be extendable and retractable. In some embodiments, retraction and extension of nozzle 320 may be controlled via a motor, such as motor 316. In various embodiments, lumen 340 may be in fluidic communication with reservoirs 312a,b, such as via joining tubes. As understood by one skilled in the art, nozzle may be of any gauge appropriate for transference of a material from reservoir to base plate. Nozzle 320 may be single channel or coaxial as required by the materials and cells being deposited. It may also include one, two, or more nozzles that join prior to or at the point of deposition. It is conceived that a premixing of materials may be performed before entry into the nozzle and deposition onto the build, as previously mentioned in this disclosure, which may occur in antechamber 332. In other embodiments, printhead may include a plurality of independent nozzles, where each nozzle has a lumen in fluidic communication with a corresponding reservoir. In such an embodiment, separate materials from each nozzle may be applied to base plate or implant during printing. In other embodiments, as discussed further in this disclosure, printhead may include a plurality of lumens that inject material into a mixing chamber, allowing different materials to be mixed prior to being applied to a base plate or implant by a singular nozzle. In some embodiments, nozzle may include two, three, or more coaxial nozzles; coaxial nozzles may contain identical or distinct materials; in some embodiments, nozzles may be configured to print vascular or other tube structures, which may be, for instance, deposited and/or printed within passages of vascular tree.

Still referring to FIG. 3, print heads and/or nozzles may be able to extend and retract to reach locations on a workpiece. In some embodiments, arc track system may feature multiple arcs that each have one or more print head moving within them. Such arc tracks may vary in radius, thereby allowing one arc to pass for example under or over another arc. Arca may generally be mounted to a circular/horizontal base, allowing the arc tracks to move relative to each other. In another embodiment, the individual arcs may be rotated within a horizontal plane while at the same time bend or rotate within a vertical plane. To reduce the height of each arc track arm, individual nozzles or other print features of print heads may be kept either within the arc and/or made collapsible. In one embodiment, material reservoir, motion control system, electronic circuits for print head, and other components thereof may all be embedded within a corresponding arc track. In another embodiment, a printhead itself may be collapsible, allowing for its height, or proximity from the arc track arm to the print bed to change in a controlled fashion. In another embodiment, only a nozzle and its supply line may be part of a collapsible and/or retractable construct allowing for the nozzle to change the proximity to the print bed.

In an embodiment, a mechanism to change proximity of a print head and/or nozzle outlet to a print bed may include pneumatic features, such as inflatable chambers, hydraulic features such as pressurized cylinders, flexible members that can be inflated and/or deflated, a linkage system of rods and plates such as for example a four-bar linkage system that can alter the proximity of the nozzle toward the print bed, or the like. System may include an active component that may also include valves, motors, actuators or the like. System may include both a deployment and retraction component. Retraction may be accomplished through, as a non-limiting example, spring energy, vacuum pressure, counter pressure or the like, for instance in hydraulic or pneumatic cylinders.

In an alternative embodiment, shape memory components may be used such components may only require changes in temperature to alter their geometry. Any means to change the proximity of the nozzle or print head to the print bed that may occur to persons skilled in the art upon reviewing the entirety of this disclosure may be used stand alone or in combination.

Still referring to FIG. 3, to print a wide variety of material types with or without cells laden within there may be a mechanism for exchanging of printheads 300 by manual or automated (e.g., robotic) means. For example, and without limitation, bioprinter system may include a bank of "filled and primed" printheads ready to exchange any printhead that empties, as needed. Some embodiments of printer may have capacity for melt-electro writing (MEW). In such embodiments, printhead 300 may be capable of MEW. In some embodiments, printhead 300 may be capable of scaffold-free deposition of cells in sizes $10\text{-}200 \times 10^3$ cells per aggregate, in suspension, in discrete aggregates, or the like. Printhead 300 may be capable of printing hydrogels with and without cell encapsulation. Printhead 300 may be capable of thermoplastic printing. Printhead 300 may be capable to printing photo-polymerized substances. Printhead 300 may be capable to printing chemically polymerized substances. Printhead 300 may be capable to printing self-assembly substances. Printhead 300 may be capable to printing thermally polymerized substances. Printhead may alternatively or additionally perform scaffold-free printing and/or cell or aggregate deposition, for instance when printing tissue components, such as chondrocytes and ECM for cartilage creation and similar components for other tissues.

In some embodiments, and continuing to refer to FIG. 3, printer system may feature a way to easily exchange print heads. Print heads may be attached to an arc track or linear track in a way permitting print heads to be quickly disconnected. A quick connect/disconnect mechanism featuring an electromagnetic clamp, solenoid, bionnet lock, or other may be used. A detached print head may then be replaced with the same type of print head, or a different type of print head. Printer system may be configured to identify what type of printhead is attached to an arc track or linear track; print head identification may be performed without limitation, by interrogation of radio frequency identification (RFID) tags attached to print heads, scanning optical codes such as quick read (QR) codes, or other forms of digital and/or analog data transmission. Print heads may be exchanged manually, semi-automatically, or automatically. In a manual process, a track system may move the print head to a dedicated position for manual exchange of the print head. Based on a series of steps and interaction with the printer system, the print head may then be exchanged. In a semi-automatic or automatic approach, print head exchange may be facilitated by a manipulator that extracts a printhead from a track and places an exchange and/or new print head onto the track. In a semi-automatic version, an exchange may proceed with interaction of an operator, while in an automatic case printer system may perform this task autonomously. A manipulator to remove and/or install print heads may include, without limitation, a robotic articulating, or multi-degrees of freedom system, allowing such a system to reach a print head anywhere within a print volume. A more simple manipulator using linear motors, belt drives, stepper motors, and/or spindles in combination with hydraulic, pneumatic, or electromagnetic end effectors may facilitate exchange in a designated area within the print volume. Non-active print heads may be stored in a separate area for replenishing, recalibration, or dwelling until future use; reservoirs thereof may be refilled using any process and/or mechanism described in this disclosure.

Still referring to FIG. 3, printhead 300 may include capabilities for additive as well as subtractive fabrication techniques, syringe-based extrusion, as well as ejection or doping, milling, laser curing, laser evaporation, or laser etching. In various embodiments, printhead 300 may include an imaging device, such as a camera or projector, to facilitate resin-based photoprint.

Still referring to FIG. 3, in one or more embodiments, printhead 300 may include one or more sensors. A "sensor", for the purpose of this disclosure, is a device that detects environmental phenomenon or characteristics and generates an electrical signal associated with the detection. In one or more embodiments, sensors may include thermal sensors, optic sensors, imaging devices, visual positioning system (VPS), photodetectors, gyroscopes, accelerometers, Halls effect sensor, voltmeter, and the like, and/or any combination thereof. For instance, and without limitation, bioprinter may include an encoder. For example, and without limitation, bioprinter may include an optical rotary encoder. Optical rotary encoder may include printhead 300 and arcuate track, such as arcuate track 116. Optical rotary encoder may be configured to measure rotational motion of one or more components of bioprinter and/or bioprinter system. For instance, and without limitation, arcuate track may include an optical pattern and printhead 300 may include a sensor. In other embodiments, encoder may be magnetically encoded. For instance, and without limitation, optical rotary encoder may provide feedback based on an interruption of light from a light source of the optical rotary encoder so that a motion of printhead 300 may be detected. In one or more embodiments, optical rotary encoder may be used to determine an orientation or position of printhead 300 and/or an output of nozzle 320 relative to the remainder of bioprinter and/or the workpiece, thus allowing printhead to more accurately apply material to workpiece during deposition and/or construction. In one or more embodiments, a belt and/or band may be disposed within grooves of arcuate tracks and connected to a motor disposed within or attached to the frame, where belt pulls printhead 300 along corresponding groove to position printhead 300. Motion may alternatively or additionally be performed using electromagnetic propulsion, wheels, gears, or the like. For instance, a motor may cause wheels or gears in a printhead to rotate and engage with linearly arrayed gear teeth and/or a surface of arc track. Alternatively or additionally, linear slide motors, which may be modified to operate in an arcuate track rather than a straight track, may move printheads in a manner analogous to slide motors operating in a CNC machine. In some embodiments, encoder may be used to detect a position of belt and/or printhead 300. In one or more embodiments, rotary encoder may be included in printhead 300, where optical or magnetic encoder may be linked to a wheel, such as a metal constructed wheel, with, for example and without limitation, a gear, connected to the linear position of printhead 300. In other embodiments, rotary encoder may be included in a spindle or reel in a belt system, such as a belt system used to slide printhead 300 along arcuate track, as mentioned in this disclosure. Encoder may be magnetically encoded or optically encoded for positions on the belt. In one or more embodiments, encoder may include position correction at reference points. For example, and without limitation, printheads, belt, controller, and so on may be configured to determine when printheads, belt, controller, and so on is at a precise point and or location, such as, for example, at an end or an apex of arcuate track, where a contact may join only when such as component, such as printhead, is in a single specific position and/or location. Such position reference may be used to correct position data of printhead, and for controller to detect error patterns and pre-correcting for such error patterns. Encoder may be used as a combination of a closed-loop feedback system that corrects by accurate absolute measurement or as an open-loop feedback system that preemptively corrects for errors based on past error readings received by, for example, controller of bioprinter.

Still referring to FIG. 3, printhead 300 and/or nozzle 320 may include environmental control 328. In one or more embodiments, print nozzle may include control gauges to control environmental variables such as temperature, humidity, gas/fluid flow, light, polymerization chemicals, any combination thereof, and the like, to print a wide variety of material types with or without cells laden within. Control gauges may allow for rapid manipulation of a physical and material parameters of a material being deposited.

Still referring to FIG. 3, printhead 300 include one or more reservoirs 312a,b. A "reservoir", for the purposes of this disclosure, is a container that material used for deposition may be stored in until use. Material from reservoirs 312a,b may be supplied to nozzle 320 and deposited on base plate to construct a desired workpiece. Reservoirs 312a,b may have environmental control gauges, such as environmental control 328, to control environmental variables such as temperature, pH, gas/fluid flow to maintain materials in pre-print condition, ready for deposition with or without cells. Environmental control 328 may allow for the rapid manipulation of temperature, fluid flow, and gas composition across a wide spectrum, which may be especially significant when cell-laden materials are used. In some embodiments, reservoirs 312a,b may store the same material. In other embodiments, reservoirs 312a,b may store different materials. For instance, in one or more embodiments, material and cell storage may occur in different reservoirs, where the cell and material mixing occur just prior to deposition (active) or after deposition (passive). In one or more embodiments, materials may be replenished in reservoirs 312a,b. In a non-limiting embodiment, printheads may include an intake port configured to connect to a source reservoir of bioprinter system, which stores additional material used for refilling printheads, so that intake port and source reservoir are in fluidic communication. Additional material may then be transferred into reservoirs 312a,b using passive (e.g., gravity/pressure) or active means (e.g., pump). In various embodiments, source reservoir may be located at an end of an arcuate track so that printhead may travel to source reservoir to automatically refill before continuing printing. Alternatively or additionally, bioprinter may include a magazine or other supply of printheads; bioprinter may include a mechanism to eject printheads into a disposal container or bin, and/or a mechanism to load a new printhead onto an arcuate track. In an embodiment, a controller and/or other computing device as described below may track a volume of material ejected from a printhead, for instance and without limitation by tracking commands to eject material or the like, and aggregating the volumes so tracked to determine an approximate total volume; alternatively or additionally, printheads may use one or more sensors to detect remaining mass and/or volume of material, for instance and without limitation by detecting a position of a plunger.

Still referring to FIG. 3, bioprinter 100 may include a mechanism for replenishing material in a print head. In one embodiment, a material reservoir may be refilled at a designated area within a print volume or within a print head storage area mentioned above. In another embodiment, a material reservoir may be exchanged with a refilled reservoir at a designated area within the print volume or within the print head storage area. In a third embodiment, a print head may be exchanged at a designated area within a print volume. Refill of the reservoir may be manually, semi-automatic, or automatic. It may involve a set of manipulators and end effectors to perform the task.

Still referring to FIG. 3, in various embodiments, printhead 300 may include multiple matrix streams in side-by-side and/or co-axial arrangement. Such a print head design may make it possible to generate anatomically inspired scaffolds, such as those for bone engineering, which may be composed of osteoinductive and osteoconductive materials. Scaffolds may be vascularized in an engineered, purposeful manner with angiogenic scaffolds, as described in further detail below. Embodiments disclosed herein may include a Bio-printer with an orbital arch-bay and printer track design by which multiple printheads suited to different biomaterial deposition and temperature regulation of a number specified by the number of materials to be printed may be able to print different components of a multi-faceted living tissue, with an internal vascular-tree focus. Print heads may be designed or configured to retract and/or extend towards a rotating flatbed, while allowing for optimal manipulation of those components to maximize the capability for tissue to be implanted and integrated successfully in a body, such as a human body. In some embodiments, printhead may include capabilities for additive as well as subtractive fabrication techniques, syringe-based extrusion, as well as ejection or doping, milling, laser curing, laser evaporation, or laser etching.

Further referring to FIG. 3, in some embodiments, heterogenous materials maybe deposited next to each other. Each needle may include temperature control mechanisms to ensure correct polymerization temperatures for some materials while preventing death to living tissue from overheating; this may be regulated by one or more controllers using temperature regulators. Further referring to FIG. 3, in some embodiments, heterogenous materials maybe deposited next to each other. Each needle may include control mechanisms for photo-crosslinking, chemical crosslinking, thermal crosslinking, or self-assembly to ensure correct polymerization for some materials while preventing death to living tissue; this may be regulated by one or more controllers.

Still referring to FIG. 3, printhead 300 may be tagged with RFID tags for identification. In various embodiments, printhead 300 may be removed from arcuate tracks. In some embodiments, printhead 300 may be exchange directly from arcuate tracks, thus permitting increased capabilities of printheads and tuning of print parameters specifically to each material. Furthermore, an exchange of printheads may facilitate a flexibility in printing various materials as well as bioprinting technique. The ability to refill printheads may allow for accurate control of small printing volumes and at the same time may provide resources to replenish it. Furthermore, this technique may eliminate use of Bowden tubes and/or other methods to feed printheads, thereby allowing free movement of orbital tracks without interference.

Still referring to FIG. 3, printhead 300 may be controlled through wireless communication, thereby reducing physical interference with wire management of control signals. For example, and without limitation, printheads 112a-c may each be controlled using controller 104 or any other computing device communicatively connected to printheads 112a-c, as shown in FIGS. 1A-1B. Printheads may include a transceiver or a second controller that facilitates communication between printhead and controller. Complexity of each printhead, including transducers and feedback signals may be contained within each printhead. Consequently, a variance within printhead complexity may not strain and/or otherwise affect complexity of a wire harness from controller to printhead as state-of-the-art additive manufacturing printheads do. In some embodiments, electrical power may be provided to printheads using wires. In other embodiments, electrical power to drive printheads may be provided through arcuate tracks. For instance, and without limitation, arcuate tracks may include a conductive trim, such as a trim made form a metal or metal allow, that transmits electrical power to print head when printhead is in contact with groove, such as groove 140 as shown in FIGS. 1A-1C.

Still referring to FIG. 3, bioprinter 100 may include an environmental control gauge for each nozzle 323. In some embodiments, environmental control gauge may be in communication with or included in controller, such as controller 104 of FIGS. 1A and 1C. In other embodiments, environmental control gauge may be a separate component. Environmental control gauge may correspond with a flathead implant rotational plate and environmental chamber. Environmental control gauge may monitor, detect, and/or control humidity and/or temperature to suit an ideal fabrication temperature and/or an ideal range of fabrication conditions for each material, allowing for rapid manipulation of humidity, temperature, and/or gas composition across a wide spectrum.

Figure 4:
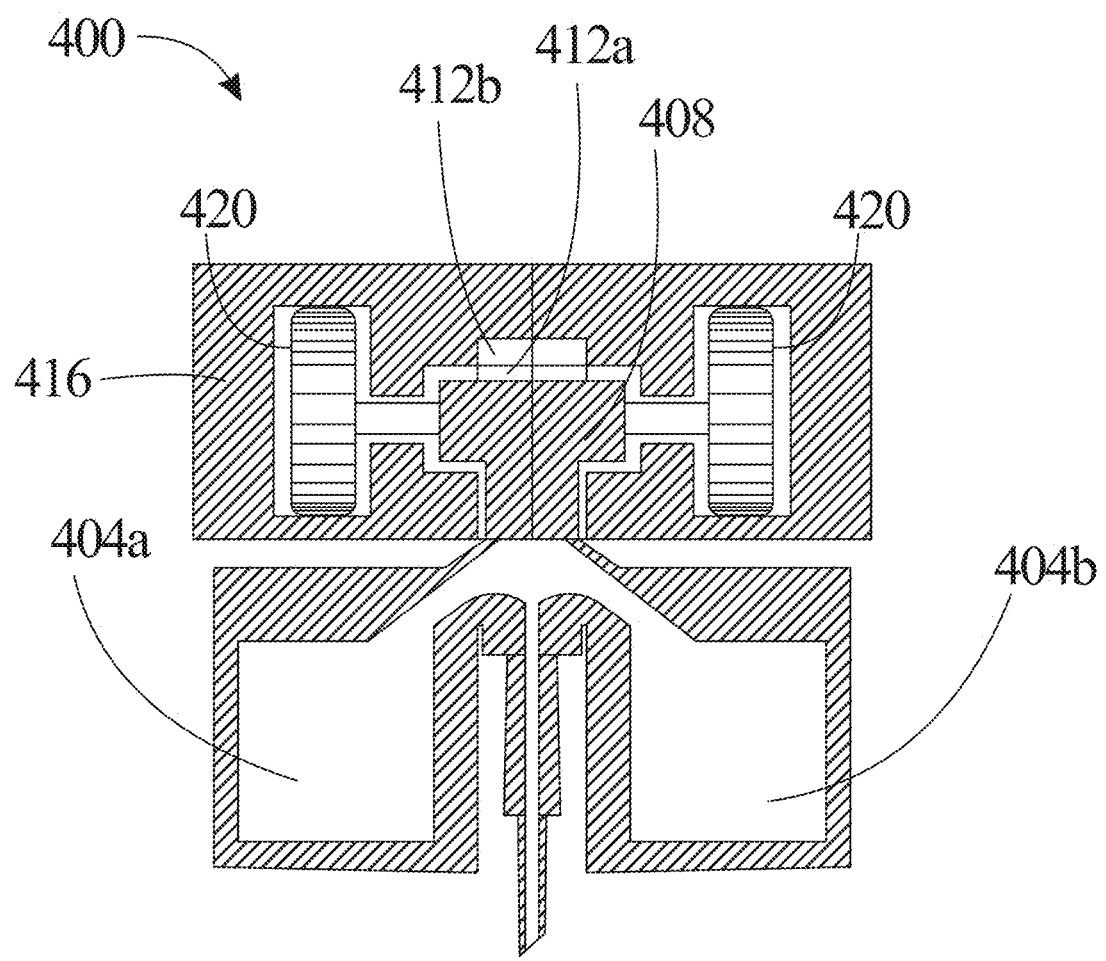
FIG. 4 is a schematic diagram illustrating a perspective view of a second exemplary embodiment of a printhead in accordance with one or more embodiments of the present disclosure.

Now referring to FIG. 4, another exemplary embodiment of printhead 400 is shown in accordance with one or more embodiments of the present disclosure. Printhead 400 may include the same components as printhead 300, such as reservoirs 404 and engagement member 408. In various embodiments, printhead may be powered wirelessly using conductors. For instance, engagement member 408 may include a conductor 412a, and arcuate track may include conductor 412b. Conductor 412a may be attached to an external surface of engagement member 408 that abuts an opposing surface of groove of arcuate track 416, where conductor 412b of arcuate track is located in groove. A "conductor", for the purposes of this disclosure, is a conductive material that allows for a transfer of electrical power. When printhead 400 is disposed within groove of arcuate track 416, conductor 412a and 412b may abut each other so that electrical energy may be transferred between arcuate track 416 and printhead 400, thus allowing for printhead 400 to be powered. In some embodiments, conductor 412b may include a wire or strip of metal that runs along a length of groove of arcuate track 416. In some embodiments, conductor 412a may include a tab or rotatable wheel of metal. For instance, and without limitation, conductor 412a may include a tab of metal that may slidably contact conductor 412b. In other embodiments, and without limitation, conductor 412a may include a band of metal wrapped about a circumference of one or more wheels 420 of printhead 400. In one or more embodiments, wheels 420 may each rotate along strips of conductor 412b, remaining in continuous contact with conductor 412b as printhead 400 traverses along arcuate track 416. Through the contact between conductors 412a and 412b, electrical power may be transferred from groove conductor 412b to printhead conductor 412a, where the electrical power is then used to power a motor of printhead 400 used to rotate wheels 420, power a mixing mechanism, extend or retract nozzle, and the like. Power may be provided to groove conductor 412b by, for example and without limitation, a wire traversing through an interior cavity of arcuate arc and being electrically connected to groove conductor 412*b*, where the wire is attached also to a power source, such as a battery or an outlet. In other non-limiting exemplary embodiments, a power source may be disposed in printhead 400 that provides electrical power to a motor of printhead and/or components thereof. In some embodiments, printhead 400 may be controlled through wireless communication, thereby reducing physical interference with wire management of control signals. Complexity of each printhead, including transducers and feedback signals may be contained within each printhead. Consequently, a variance within printhead complexity may not strain complexity of a wire harness from controller to a printhead as state-of-the-art additive manufacturing printheads do.

Figure 5:
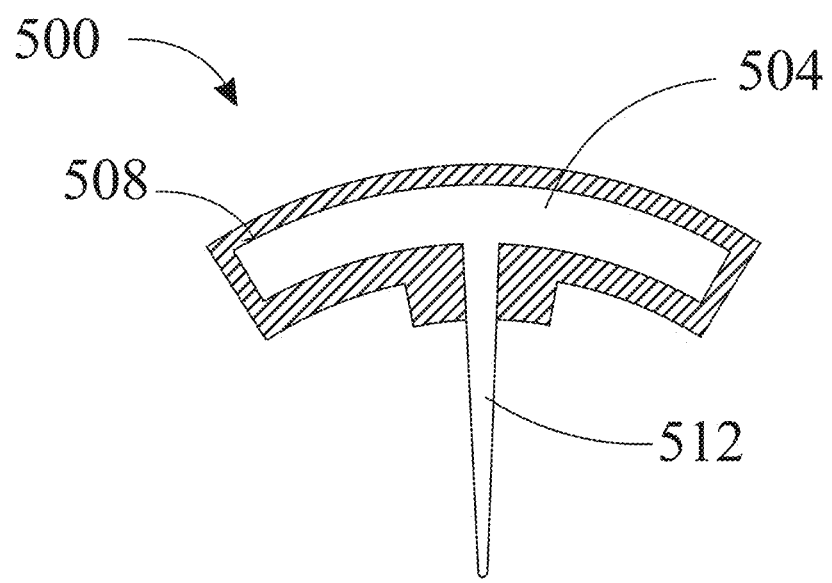
FIG. 5 is a schematic diagram illustrating a perspective view of a third exemplary embodiment of a printhead in accordance with one or more embodiments of the present disclosure.

Now referring to FIG. 5, another exemplary embodiment of printhead 500 is shown in accordance with one or more embodiments of the present disclosure. Printhead 500 may include the same components as printheads 300 and/or 400. However, reservoir 504 of printhead 500 may be disposed within engagement member 508 of printhead 500. For instance, and without limitation, reservoir 504 may be defined by an interior surface of engagement member 508 and in fluidic communication with nozzle 512. Engagement member and reservoir may be at least partially received by groove of arcuate track.

Figure 6:
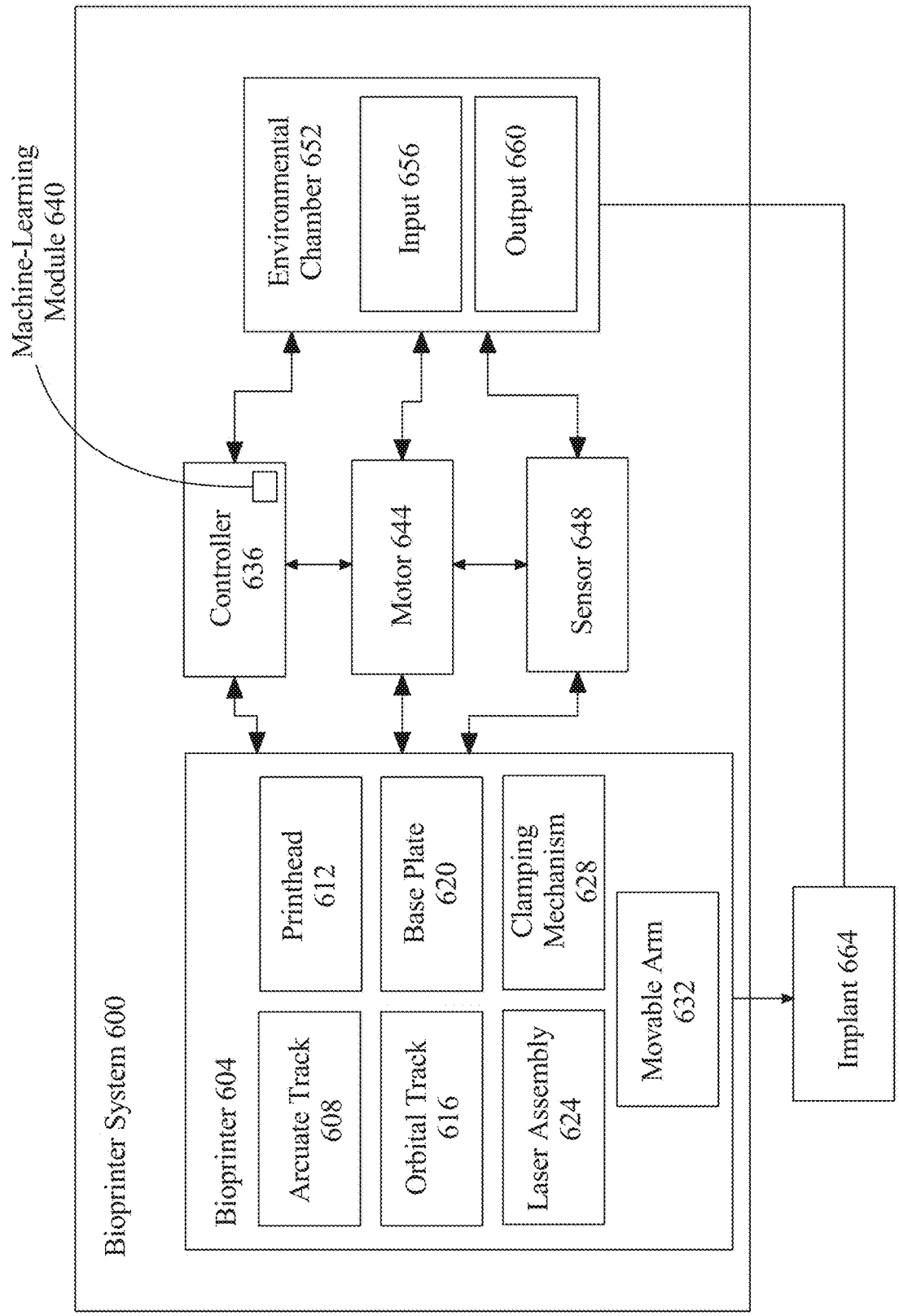
FIG. 6 is a block diagram illustrating a of an exemplary embodiment of a bioprinter and a tank in accordance with one or more embodiments of the present disclosure.

Now referring to FIG. 6, a block diagram of an exemplary embodiment of a bioprinter system 600 is shown. Bioprinter system may include a bioprinter 604. Bioprinter may include any bioprinter discussed in this disclosure. As previously mentioned, bioprinter 604 may include one or more arcuate tracks 608 that are rotatably connected to corresponding one or more orbital tracks 616 of bioprinter 604. Bioprinter 604 may also include one or more printheads 612, a base plate 620, and the like. For instance, and without limitation, biosystem 600 and/or bioprinter 604 for building an implant by sequential deposition of material may include base plate 620, printhead 612 with a nozzle, where nozzle defines a lumen and be configured to deposit a material on base plate 620 using lumen. Further, biosystem 600 and/or bioprinter 604 may also include arcuate track 608 including a groove, where printhead 612 is slidably attached to arcuate track 608 and at least partially disposed within groove. In one or more embodiments, arcuate track 608 includes a plurality of concentric arcuate tracks, as described previously in this disclosure. For example, and without limitation, the plurality of concentric arcuate tracks may include a first arcuate track, a second arcuate track, and a third arcuate track, where each of the first arcuate track, the second arcuate track, and the third arcuate track are configured to move independently relative to each other. In one or more embodiments, printhead includes a first printhead slid ably attached to first arcuate track, a second printhead slidably attached to second arcuate track, and a third printhead slidably attached to third arcuate track, where each printhead is configured to traverse along a groove of each corresponding arcuate track. In various embodiments, arcuate track includes a first end and a second end, where the first end and the second end are pivotably attached to frame using rotational joints. In various embodiments, printhead includes a reservoir in fluidic communication with the lumen and configured to store the material until the material is deposited onto the base plate. In various embodiments, printhead includes an environmental control, where environmental control is configured to adjust environmental conditions of the reservoir, as discussed further in this disclosure. In one or more embodiments, nozzle includes a telescoping nozzle configured to extend and retract relative to the implant. In one or more embodiments, printhead includes a motor, printhead includes a first conductor, groove includes a second conductor, and first conductor and second conductor abut such that electrical power may be transferred from the second conductor to the first conductor to power the motor of the printhead, as previously discussed in this disclosure.

Still referring to FIG. 6, biosystem 600 and/or bioprinter 604 includes frame rotatably attached to arcuate track 608. In one or more embodiments, frame may include a plurality of concentric orbital tracks, that include a first orbital track pivotably attached to first arcuate track, a second orbital track pivotably attached to second arcuate track, and a third orbital track pivotably attached to third arcuate track, where each of first orbital track, second orbital track, and third orbital track is configured to rotate about a central vertical axis of the frame. Further, biosystem 600 and/or bioprinter 604 includes a controller 636 communicatively connected to base plate 620, arcuate track 608, and/or frame (e.g., orbital track 616), where controller 636 is configured to control movement of base plate, the arcuate track, and the frame. In one or more embodiments, bioprinter system 600 and/or bioprinter 604 further includes a shaft, where base plate is moveably attached to shaft and the shaft is configured to translate base plate parallel to a central vertical axis of frame.

Still referring to FIG. 6, in several embodiments, bioprinter system 700 and/or bioprinter 604 may include a laser assembly 624, which may be mounted, for example and without limitation, on a surface above bioprinter and/or a surface of environmental chamber, which may be a separate attachment on center with print arches and may be designed to dehydrate, evaporate, or etch components of a printed implant. For instance, and without limitation, laser assembly may be mounted on a ceiling of print chamber as a separate attachment centered with arcuate tracks 608 and/or frame, where laser assembly in configured to designed to dehydrate, evaporate, or etch components of printed implant.

Still referring to FIG. 6, a clamping mechanism including extendable arms, such as moveable arms previously mentioned in this disclosure, parallel to base plate 620 may be capable of moving in x, y, and z directions with respect to base plate to the maximum extent of the print volume may be deployed to hold and manipulate an object. In some embodiments, multiple-stacked clamping mechanisms may be employed, where a number and type of clamps may vary as required by implant 664, printed materials, and/or the actions needed. Embodiments may include a mechanism external to a print volume (e.g., over the print bed and/or base plate), whereby a printed object, such as an implant 664, may be moved, manually or by the moveable robot arm 632 of bioprinter system 600 and/or bioprinter 604, and subsequently lowered in a sterile container for transport outside bioprinter, as previously mentioned. A printed structure (non-viable structure, scaffold, cellular construct or living bioprinted implant, among others) may be contained within a sterile container by manual or automated means. Once printed object, such as implant, is within container, a lid may be placed upon the container. Ports in the container wall (near the bottom of the container) may add and remove medium or other substances as required by the build. This capacity may be most applicable to living implants, where sterile, isotonic saline, growth medium or other mixtures may be injected into the container to maintain the hydration and cell viability of the printed implant. The whole container may then be relocated outside the printer. A new print transport container may be put in position for the subsequent objects, scaffolds, or living implants, including components of the bioreactor itself, e.g., an adapter (DFA, as defined in the bioreactor patent) of similar or different polymeric materials than that used in the print of the implant by interchanging the print heads as needed. While an implant is in a sterile container, print heads may be interchanged and the chamber re-sterilized if necessary.

Still referring to FIG. 6, bioprinter system and/or bioprinter 604 may include a controller 636. Controller 636 may include a machine-learning module 640. In one or more embodiments, controller 636 may include controller 104 (shown in FIGS. 1A and 1C), controller 636 (FIG. 6), controller 704 (shown in FIG. 7), computing device 1100 or any other controller described in this disclosure and may be configured to control various components of bioprinter 100,200 and/or bioprinter system 600,700. As previously mentioned, controller may be communicatively connected to, part of, or include a computing device. Computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of system 100 and/or computing device.

Computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 6, bioprinter may include multiple printheads, as previously mentioned. Bioprinter may print multiple materials; each distinct material may be printed using a different printhead. Materials that may be used in bioprinter may include, without limitation, collagens (1, 2, 6, 9, 11, among others), gelatin, alginate, fibrin, chitosan, and chitin (in their many forms), cellulose, hyaluronic acid, hyaluronan, glucosamine, extracellular matrix components and preparations, devitalized bone powder and forms thereof. Materials that may be used in a printer/bioprinter may include, without limitation, calcium aluminate, calcium carbonate, calcium sulfate, tri-calcium phosphate (Alpha and beta), bicalcium phosphate, hydroxyapatite, bioactive glass(es). Materials that may be used in a printer/bioprinter may include, without limitation, Poly-capro-lactone (PCL), Poly-lactic-acid (PLA), Polycaprolactone-co-lactide, (PCLA), Poly-lactic-co-glycolic acid (PLGA), Polyethylene glycol (PEG), Polyethylene oxide (PEO), Poly-L-lactide) (PLLA). Materials that may be used in a printer/bioprinter may include, without limitation, Polyvinyl alcohol (PVA), Polyvinyl siloxane (PVS) and other plastics (as may be used in FDM and MEW), polyorthoester (POE). Materials that may be used in a printer/bioprinter may include, without limitation, Methacrylates, Diacrylates, oligomerics, and thiols (thiol-ene, and -yne) of the above for polymerization as required. Other materials that may be used in bioprinter may include, without limitation, Co-polymers (such as but not limited to PLLA-PEG-PLLA, with other polymer monomers), block polymers, multi-arms, of the polymers above to provide materials of different mechanical properties. Other materials that may be used in bioprinter may include, without limitation, Dextran, starch, cyclodextrin, and/or silica.

Still referring to FIG. 6, controller and/or computing device may determine a design of a scaffold and/or implant to generate given a void to fill in a patient, a deficit and/or area of deficit, an area of necrotic tissue to be generated using an automated manufacturing device and/or system. A software suite to design a patient/defect specific implant may generally look at volumes to fill, for instance, after removal and/or debridement of degraded, necrotic, or other bone, joint, or other body parts and/or portions thereof, and selecting tissues to use within the scaffold. Processes for removal of diseased, necrotic, or other material for replacement with and/or insertion of an implant may be as described in U.S. Provisional Application Ser. No. 63/307,608, filed on Feb. 7, 2022, and entitled "SMART DEBRIDEMENT TOOL SYSTEM PATENT APPLICATION," the entirety of which is incorporated herein by reference. Tissues may be selected and arranged in particular geometric, branching, and/or fractal arrangements to provide exterior and interior structural support, patterns and/or volumes within which sacrificial materials can be added to provide a growth medium and/or volume to be replaced by patient tissues as they infiltrate such materials, or the like. Each such design may be tracked by observing what works best in a bioreactor, an animal patient, and/or a human patient. Results of such observations may then be utilized to generate positive and/or negative training examples correlating volumes, tissue types, and/or locations to be replaced and/or filled with combinations and/or geometric arrangements of manufacture implant and/or printed materials that will successfully fill and/or act as implants for such volumes, tissue types, and/or locations. Training examples may be used to train a classifier, machine-learning model, and/or neural network to output a design, including without limitation an STL file with labeling on surfaces and/or volumes to indicate materials to be deposited therefor, given inputs describing volumes, tissue types, and/or locations to be replaced and/or filled; training examples may further correlate such information with patient data, which may be a further input to generate output material choices.

Software may operate using reliable models of osteonecrosis, and/or tissue degradation and/or growth patterns, change in bone mineral density, volume and morphology as recorded using any or all medical imaging processes, systems, and/or techniques, and correlation with PET imaging (metabolism), angiography (vasculature) and biochemical outcome markers over time: Structure, viability, bone density, angiography, and metabolism. AI, including any models and/or neural networks trained as described above, may be used to learn how to model death tissue (from health, to stress, to disease to death).

Using reliable models, software and/or users thereof may observe bone development in an animal model (if the data doesn't exist already), where bone structure, void volume (where the hydrogel is), cell metabolism, tissue differentiation and mechanical properties are correlated in space and time. These in vivo observations may be supported by tissue differentiation and maturation in vitro analyzed in the same way. AI may be used to learn what density of vascularity, medium content and flow rate is necessary and/or optimal to optimize (bone) differentiation; AI may automatically adapt this to a patient defect and design and/or help design an optimal implant.

Software suite may be used to model differentiation of an implant over time. Results of this may be compared to actual outcomes. Comparison may serve to inform software and/or observers of a problem in an implant and suggest a treatment or solution. Specifically dimensions of a vascular tree necessary to support differentiation and maturation of the implant may be determined. Thus a structure of an implant (to affect appropriate mechanical and vascular properties) and tissue distribution of functionality will be determined. Alternatively, observations may be used to generate further training examples, to further train AI. Some modalities employed may be used in a patient after surgery. Combined with outcomes of non-invasive imaging techniques used in a patient, software may indicate implant health or sickness (when compared to optimized model), and perhaps indicated adjunct therapies and/or changes in rehabilitation that may be necessary and/or beneficial.

A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Computing device and/or another device may generate a classifier using a classification algorithm, defined as a processes whereby a computing device derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 6, computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A) \div P(B)$, where P(AB) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 6, computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 6, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\sum_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Computing device may alternatively or additionally implement, utilize, and/or communicated with a software suite to render implant design for printing. Software suite will slice the implant into printable layers. A slicer as disclosed herein may account for multiple materials governed by multiple print-heads, wherein distinct printheads may be dedicated to distinct materials. Labeling in STL may indicate surfaces and/or volumes specific to a given material; slicer may then include and/or call sub-slicers that work out thicknesses for different depositions of different materials and work out layers to deposit to generate desired volumes. Different layers may have different thicknesses depending on material; slicer may work out ratios of layers for one material to another material and generate an overall printing plan to produce a unified design. Design may include Hydrophobic outer material, bone-like interior material, and inner materials that are hydrophilic, and have a certain affinity to one another. Interior materials may be "sacrificial" in that they are to be grown into by subject tissues; a remainder of implant "bone-like" materials may be more gradually replaced. Calculation of precise material volume and cell number to complete a print and a number of print heads required to accomplish the task may be determined based on the above determinations. In some embodiments, bioprinter 100 may include and/or instantiate an orbital printer design to facilitate movement of different print heads and fueling of materials through a highly flexible rotating (suited to shape) visibility-oriented arch-bay system, whereby materials may be fed through each orbital shell determined by a need for a material in that arch/shell.

Software suite may determine a print order and placement within a 3D polar coordinate space that will be to account for base plate and print plane changing angle and elevation. Print order and arc trach and nozzle placement to avoid collision and injury to device may be a constraint used in determining an optimal or best-practice sequence of print-head movements and layer depositions. Optimization may be based on optimization and/or minimization of an objective function of various goals, including total printer and/or manufacturing device runtime, efficient use of materials, robustness of a final result, and the like. A mathematical function, described herein as an "objective function," may be used by computing device to score each possible sequence of print-head movements and depositions, either given a previously calculated and/or chosen movement, or over an entire process. Output of objective function may be a score.

Still referring to FIG. 6, optimization of objective function may include performing a greedy algorithm process. A "greedy algorithm" is defined as an algorithm that selects locally optimal choices, which may or may not generate a globally optimal solution. For instance, computing device may select a subsequent sequence set so that scores associated therewith are the best score for that set, without regard to an overall optimal sequence. In such an example, optimization may determine the combination of movements such that each set of movements to be determined includes the highest score possible. Objective function may be formulated as a linear objective function, which computing device may solve using a linear program such as without limitation a mixed-integer program. A "linear program," as used in this disclosure, is a program that optimizes a linear objective function, given at least a constraint as described above. A mathematical solver may be implemented to solve for the set that maximizes scores; mathematical solver may be implemented on computing device and/or another device in system, and/or may be implemented on third-party solver. Optimizing objective function may include minimizing a loss function, where a "loss function" is an expression an output of which an optimization algorithm minimizes to generate an optimal result. As a non-limiting example, computing device may assign variables relating to a set of parameters, which may correspond to score components as described above, calculate an output of mathematical expression using the variables, and select a parameter set that produces an output having the lowest size, according to a given definition of "size," of the set of outputs representing each of plurality of candidate ingredient combinations; size may, for instance, included absolute value, numerical size, or the like. Selection of different loss functions may result in identification of different potential pairings as generating minimal outputs.

Still referring to FIG. 6, system, computing device, and/or software may perform control of a print. This suite of software may be used to control movement of print heads, arcs, and/or print bed, for instance using Wi-Fi RFID coordinated control and replacement and exchange of printheads as needed. It may also enable automated movement/manipulation of a printed object (if needed for any reason), including access to new print angles (for example flipping the print 180 degrees top-to-bottom) or moving structure or implant to the sterile container mechanism (described in the BioPrinter patent); movement of base plate may also be selected along with printhead movement to generate an optimal process as described above.

Still referring to FIG. 6, bioprinter system and/or bioprinter 604 may include a motor 644. As previously mentioned, motor 644 may be attached to one or more rotational joints and power movement of arcuate tracks 608 and/or orbital tracks 616. In some embodiments, motor may be disposed within or attached to frame, such as frame 120 of FIG. 1A. Motor 644 may include, without limitation, any electric motor, where an electric motor is a device that converts electrical energy into mechanical energy, for instance by causing a shaft, such as rotor shaft, to rotate. In one or more embodiments, motor may be driven by direct current (DC) electric power. For instance, motor may include a brushed DC motor. In various embodiments, motor 644 may include, without limitation, a brushless DC electric motor, a permanent magnet synchronous motor, a switched reluctance motor, and/or an induction motor. In other embodiments, motor may be driven by electric power having varying or reversing voltage levels, such as alternating current (AC) power, which may be produced by an alternating current generator and/or inverter or by a switching power source.

In one or more embodiments, bioprinter system 600 and/or bioprinter 604 may include a sensor 648, as previously discussed in this disclosure. Sensor 648 may include a plurality of sensors in the form of individual sensors or a sensor working individually. Sensor 648 may include a plurality of independent sensors, as described in this disclosure, where any number of the described sensors may be used to detect any number of physical and/or electrical quantities associated with bioprinter system. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of sensor to detect phenomenon and/or characteristics may be maintained.

Still referring to FIG. 6, in one or more embodiments, sensor 648 may include a motion sensor. A "motion sensor," for the purposes of this disclosure, refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. Sensor 648 may include, torque sensor, gyroscope, accelerometer, magnetometer, inertial measurement unit (IMU), pressure sensor, force sensor, proximity sensor, displacement sensor, vibration sensor, or the like. Motion sensors may be selected to detect motion in three directions spanning three dimensions. For instance, and without limitation, a gyro sensor, such as a gyroscope, may be used to detect an orientation of one or more printheads or tracks.

Still referring to FIG. 6, in one or more embodiments, sensor 648 may include an encoder, as previously mentioned. An encoder may be configured to detect and determine a motion of printhead. For example, and without limitation, encoder may be a rotary encoder. In one or more embodiments, encoder may be communicatively connected to controller 636. Encoder may be configured to transmit an output signal, which includes feedback, and controller, as a result, may transmit a signal based on the received feedback from encoder.

Still referring to FIG. 6, sensor 648 may include an inertial measurement unit (IMU). In one or more embodiments, an IMU may be configured to detect a change in specific force of a body. An IMU may include an accelerometer, a gyro sensor, a magnetometer, an E-compass, a G-sensor, a geomagnetic sensor, and the like. In some embodiments, sensor 648 may include one or more motion sensors. Sensor 648 may include one or more environmental sensors, including without limitation sensors for detecting ambient temperature, humidity, or the like.

Still referring to FIG. 6, in one or more embodiments, sensor 648 may include electrical sensors. Electrical sensors may be configured to measure voltage across a component, electrical current through a component, and resistance of a component. In one or more embodiments, sensor 648 may include thermocouples, thermistors, thermometers, passive infrared sensors, resistance temperature sensors (RTDs), semiconductor based integrated circuits (IC), a combination thereof or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within sensor 648, may be measured in Fahrenheit (° F.), Celsius (° C.), Kelvin (° K), or another scale alone or in combination. The temperature measured by sensors may include electrical signals, which are transmitted to their appropriate destination wirelessly or through a wired connection.

As previously mentioned, communicatively connecting is a process whereby one device, component, or circuit is able to receive data from and/or transmit data to another device, component, or circuit. A communicative connection may be achieved through wired or wireless electronic communication, either directly or by way of one or more intervening devices or components. Further, communicative connecting can include electrically coupling at least an output of one device, component, or circuit to at least an input of another device, component, or circuit. For example, and without limitation, via a bus or other facility for intercommunication between elements of a controller as described in this disclosure. Communicative connecting may also include indirect connections via wireless connection, radio communication, low power wide area network, optical communication, magnetic, capacitive, or optical coupling, or the like. For example, and without limitation, sensor 648 may include a potentiometric sensor, inductive sensor, capacitive sensor, piezoelectric sensor, strain gauge sensor, variable reluctance sensor, and the like thereof. Sensor 648 may include one or more environmental sensors, which may function to sense parameters of the environment surrounding the bioprinter. An environmental sensor may include without limitation one or more sensors used to detect ambient temperature, barometric pressure, and/or humidity, one or more motion sensors which may include without limitation gyroscopes, accelerometers, inertial measurement unit (IMU), and/or magnetic sensors, one or more humidity sensors, one or more oxygen sensors, or the like. Additionally or alternatively, sensor 648 may include a geospatial sensor. Sensor 468 may include one or more proximity sensors, displacement sensors, vibration sensors, and the like thereof.

Still referring to FIG. 6, sensor 648 may include an optical sensor. As used in this disclosure, an "optical sensor" is an electronic device that alters any parameter of an electronic circuit when contacted by visible or NIR light. Optical detectors may include, without limitation, charge-coupled devices (CCD), photodiodes, avalanche photodiodes (APDs), silicon photo-multipliers (SiPMs), complementary metal-oxide-semiconductor (CMOS), scientific CMOS (sCMOS), micro-channel plates (MCPs), micro-channel plate photomultiplier tubes (MCP-PMTs), single photon avalanche diode (SPAD), Electron Bombarded Active Pixel Sensor (EBAPS), quanta image sensor (QIS), spatial phase imagers (SPI), quantum dot cameras, image intensification tubes, photovoltaic imagers, optical flow sensors and/or imagers, photoresistors and/or photosensitive or photon-detecting circuit elements, semiconductors and/or transducers. APDs, as used herein, are diodes (e.g., without limitation p-n, p-i-n, and others) reverse biased such that a single photon generated carrier can trigger a short, temporary "avalanche" of photocurrent on the order of milliamps or more caused by electrons being accelerated through a high field region of the diode and impact ionizing covalent bonds in the bulk material, these in turn triggering greater impact ionization of electron-hole pairs. APDs may provide a built-in stage of gain through avalanche multiplication. When a reverse bias is less than breakdown voltage, a gain of an APD may be approximately linear. For silicon APDs this gain may be on the order of 10-100. The material of the APD may contribute to gains.

Still referring to FIG. 6, according to some embodiments, sensor 648 may include any of an electro-optical sensor, an image capture sensor, a machine-vision system, a high-speed camera, a thermal imaging camera, a multispectral camera, a pressure sensor, and the like. Still referring to FIG. 6, bioprinter system 600 may include an environmental chamber 652 configured to provide specific environmental conditions for the material. Environmental chamber may contain one or more elements of printer, including without limitation base plate, arc tracks, and the like In one or more embodiments, controller 636 may be configured to control environmental chamber or components thereof. In various embodiments, environmental chamber 652 is configured to contain an isotonic saline or other solutions, such as without limitation medium, fluids for coating, or the like; such solutions may, in some instances, include a bath toward a bottom of environmental chamber into which base plate can dip and/or lower, and/or one or more vats within environmental chamber, such as without limitation one or vats for containment of implants immersed in saline, as well as other containers, racks, or sets of material, such as without limitation a bank of print heads that may be pre-filed, pre-configured, pre-powered, or the like, one or more arms such as robot arms, a bank of arm functional ends including lasers, clamps, printhead movers, subtractive molding devices and water/solvent jets, or the like, for instance and without limitation as described in this disclosure.

In one or more embodiments, environmental chamber 652 includes an input 656 and an output 660, where solutions may be transferred into or out of environmental chamber, respectively, as discussed further below in this disclosure. In various embodiments, bioprinter system 600 and/or bioprinter includes shaft, where base plate is moveably attached to the shaft and the shaft is configured to translate base plate parallel to a central vertical axis of the frame. Printer may include, one or more mechanisms shaft configured to translate the base plate and/or a workpiece produced by the bioprinter into environmental chamber 652 one or more vats of isotonic saline and/or medium, a transport case, and/or a bioreactor for transport and/or storage.

Further referring to FIG. 6, environmental chamber may include any sensor as described in this disclosure, including but without limitation temperature sensors, humidity sensors, O2 and/or CO2 concentration sensors, cameras such as visual and/or laser photodetectors for optical tracking of position and motion sensors of equipment, sensors to detect position and/or temperature, PH, cellular viability within the implant containers, and/or sensors to detect movement within the containers. Now referring to FIG. 7, a front view of an exemplary embodiment of a bioprinter system 600 is shown in accordance with one or more embodiments of the present disclosure. In one or more embodiments, a controller 704 may control one or more components of bioprinter 700, as discussed in FIGS. 1A-5. In one or more embodiments, base plate 708 may include a multiaxial build plate which may allow for translation and/or rotation in five axes: x, y, z, rotation, and rocking. This may allow for printing on and through materials that have already been printed from five sides (excluding the adhered surface), and which allows for very finite and ornate and particular printing, and the filling of void space after materials have been printed. In one or more embodiments, base plate 708 may be attached to a shaft 712 using a tilt mechanism, such as a rotary connector 716. Rotary connector is configured to rotate base plate 708 relative to shaft 712. Furthermore, shaft 712 may include a lift mechanism, which is configured to move base plate 708 along a y-axis of a Cartesian-coordinate space. In other embodiments, shaft 712 may be configured to rotate about a longitudinal axis E of shaft 712 and/or along a central axis A of bioprinter such that base 708 may be rotated about y-axis. Still referring to FIG. 7, bioprinter system 700 may include a base plate vacuum. Base plate vacuum may include a vacuum manifold on its upper surface to fix printed object, such as an implant, to a top surface of base plate. In one or more embodiments, base plate may include a print bath, where print bath is curved or has raised edges that allow print bath to hold a fluid. In embodiments, print bath may include a resin bath. Thus, base plate may be exchanged for a print bath for resin-based printing. Baseplate may include without limitation any sensors described in this disclosure. A vacuum attachment, for instance, may include a pressure sensor to ensure that a workpiece and/or DFFA layer is held securely to baseplate. Baseplate may include sensors to detect position of baseplate, such as angle, displacement height and/or x, y, and z positions or polar coordinate positions, mass, for instance to determine if medium is in a container and/or how much is present, temperature PH, cellular viability of the medium, or the like.

Figure 7:
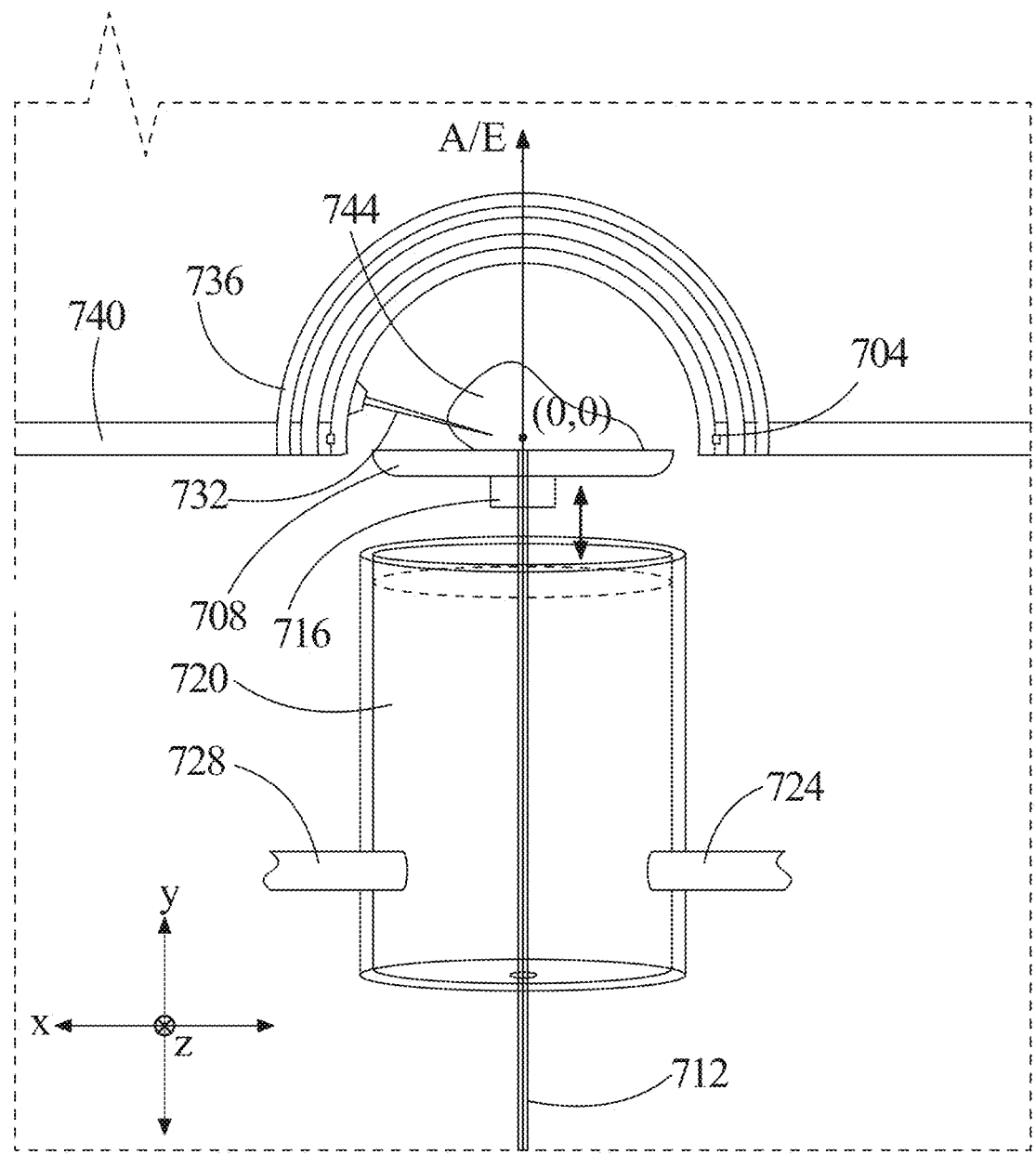
FIG. 7 is a schematic diagram illustrating a perspective view of an exemplary embodiment of a bioprinter and a tank in accordance with one or more embodiments of the present disclosure.

Still referring to FIG. 7, bioprinter system 700 may include an environmental chamber 720 that may be configured to adjust temperature, humidity, and/or gas mixture within the print volume, for example, and without limitation, as guided and/or driven by an environmental control gauge or controller 704, as described above in this disclosure. For the purposes of this disclosure, an "environmental chamber" or "container" is an enclosure or tank configured to provide environmental conditions conducive to and/or ideal for printing a desired object using specific materials. As different materials may require different environmental parameters, environmental chamber 720 may be able to readily adjust environmental conditions and/or parameters of environmental chamber 720. In some embodiments, environmental chamber may be partially enclosed. In other embodiments, environmental chamber may be fully enclosed. In one or more embodiments, environmental chamber 720 may be sterilizable by ultraviolet (UV) light and/or any other suitable sterilization alternative. In various embodiments, sterility may be maintained by air exchange through, for example and without limitation, a high efficiency particulate air (HEPA) filter system that is in fluidic communication with environmental chamber 720. In various embodiments, toxic fumes, if they exist, may be removed by a vacuum system and/or with carbon filtration. In some embodiments, HEPA filter systems and sterility systems may not be operated at the same time. In various embodiments, a temperature of environmental chamber 720 may be adjusted through direct and/or indirect means. For instance, and without limitation, temperature of environmental chamber 720 may be adjusted and/or regulated using a thermal management system, heating and/or cooling elements associated with air circulation, and/or indirect means through radiating heat elements. In some embodiments, humidity and gas mixture levels may be independently controlled and/or adjusted based on a material being printed or about to be printed.

Still referring to FIG. 7, as previously mentioned bioprinter, such as bioprinter 100 or bioprinter 200, of bioprinter system 700 may include a print platform, such as base plate 708, centered within concentric print arches. Print platform may include a cylindrical container where a roof thereof is the print platform. Roof/print platform may be lowered to rest onto a floor of cylinder by a central stem moving vertically along an axis of the cylinder by servomotor or other device. With this mechanism, a workpiece, such as a printed implant, may be contained within a sterile container, such as environmental chamber 720 or a storage container. Once an implant is within container, a lid may be placed upon container in an automated manner using a swing-arm mechanism, such as robot arm mentioned previously in this disclosure, that may be anchored within a wall of the container. Through an input port, such as input port 724, in container wall, for instance and without limitation, near a bottom of container, sterile, isotonic medium may be injected into container to maintain hydration and cell viability of a printed implant. In various embodiments, a separate port may exist opposite, such as output port 728, for removal of medium from container. Container as a whole may then be relocated beyond a circumference of base plate 708. In some embodiments, a new base plate may be put in position for a subsequent structure, implant, or other structure, including components of a bioreactor itself, such as, for example, an adapter (e.g., DFFA of a bioreactor system) of similar or different polymeric materials than that used in the print of the implant by interchanging the printheads as needed. Such bioreactors may be as described in U.S. Provisional Application Ser. No. 63/306,990, filed on Feb. 4, 2022, and entitled "BIOREACTOR PATENT APPLICATION," the entirety of which is incorporated herein by reference.

Still referring to FIG. 7, while an implant is in sterile container, printheads 732 may be interchanged and the environmental chamber re-sterilized if necessary. In one or more embodiments, a clamping mechanism may be included, including one or more extendable and retractable clamps parallel to print base and capable of moving vertically with respect to the print base to a maximum extent of the print volume and capable of 180 degrees of clockwise and counterclockwise motion. Clamping mechanism may be deployed to hold an object that is printed as necessary. Several stacked clamping mechanisms may be included; however, a number and type of clamps may vary as required by an implant to be produced, printed materials and/or the actions needed.

In one or more embodiments, printheads 732 may be exchange and/or interchanged as previously described in this disclosure. System 700 may be configured to exchange printheads directly from arcuate tracks 736, manually or via robotic control. Having interchangeable printheads may increase capabilities of printheads and tuning of print parameters, specifically to each material. Furthermore, an exchange of printheads may facilitate a flexibility in printing various materials as well as bioprinting technique. Various techniques for printhead identification may be employed, as previously discussed in this disclosure. For instance, and without limitation, printheads may be tagged with RFID tags for identification. System 700 may be able to remove printheads 732 from arcuate tracks 736 and place them at or in an adjacent or nearby chamber for either refilling or dwelling. Having an ability to refill printheads may allow accurate control of small printing volumes, which at the same time may provide resources to replenish it. Furthermore, this technique may eliminate the use of Bowden tubes or other methods to feed the printheads, thereby allowing free movement of the orbital tracks without interference.

Figure 8:
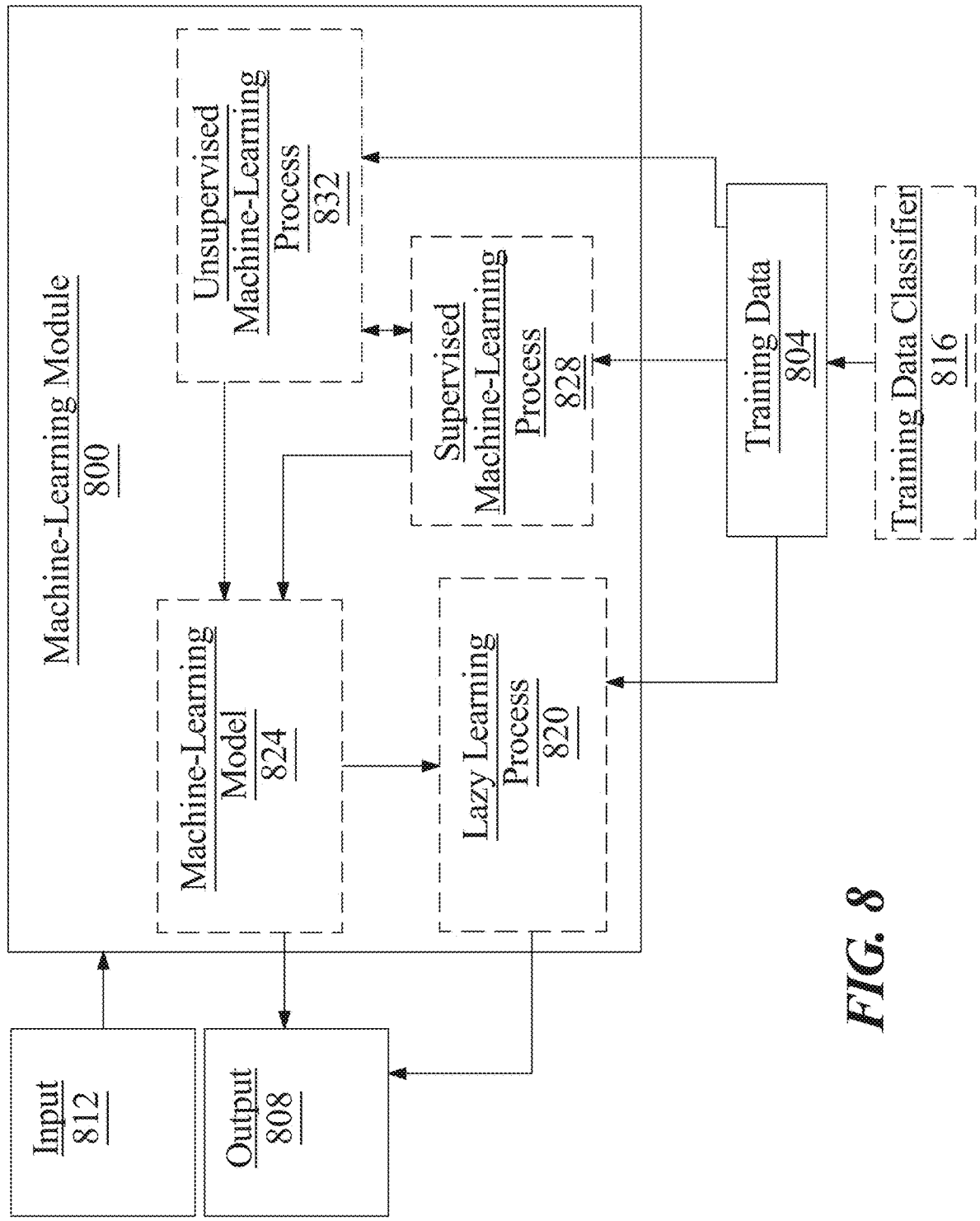
FIG. 8 is a block diagram illustrating an exemplary embodiment of a machine-learning module in accordance with one or more embodiments of the present disclosure.

Referring now to FIG. 8, an exemplary embodiment of a machine-learning module 800 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 804 to generate an algorithm that will be performed by a computing device/module to produce outputs 808 given data provided as inputs 812; this is in contrast to a non-machine learning software program where the commands to be executed are determined in advance by a user and written in a programming language.

Still referring to FIG. 8, "training data," as used herein, is data containing correlations that a machine-learning process may use to model relationships between two or more categories of data elements. For instance, and without limitation, training data 804 may include a plurality of data entries, each entry representing a set of data elements that were recorded, received, and/or generated together; data elements may be correlated by shared existence in a given data entry, by proximity in a given data entry, or the like. Multiple data entries in training data 804 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 804 according to various correlations; correlations may indicate causative and/or predictive links between categories of data elements, which may be modeled as relationships such as mathematical relationships by machine-learning processes as described in further detail below. Training data 804 may be formatted and/or organized by categories of data elements, for instance by associating data elements with one or more descriptors corresponding to categories of data elements. As a non-limiting example, training data 804 may include data entered in standardized forms by persons or processes, such that entry of a given data element in a given field in a form may be mapped to one or more descriptors of categories. Elements in training data 804 may be linked to descriptors of categories by tags, tokens, or other data elements; for instance, and without limitation, training data 804 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 8, training data 804 may include one or more elements that are not categorized; that is, training data 804 may not be formatted or contain descriptors for some elements of data. Machine-learning algorithms and/or other processes may sort training data 804 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 804 to be made applicable for two or more distinct machine-learning algorithms as described in further detail below. Training data 804 used by machine-learning module 800 may correlate any input data as described in this disclosure to any output data as described in this disclosure.

Further referring to FIG. 8, training data may be filtered, sorted, and/or selected using one or more supervised and/or unsupervised machine-learning processes and/or models as described in further detail below; such models may include without limitation a training data classifier 816. Training data classifier 816 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 800 may generate a classifier using a classification algorithm, defined as a processes whereby a computing device and/or any module and/or component operating thereon derives a classifier from training data 804. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 8, machine-learning module 800 may be configured to perform a lazy-learning process 820 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 804. Heuristic may include selecting some number of highest-ranking associations and/or training data 804 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 8, machine-learning processes as described in this disclosure may be used to generate machine-learning models 824. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 824 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 824 may be generated by creating an artificial neural network, such as a convolutional neural network comprising an input layer of nodes, one or more intermediate layers, and an output layer of nodes. Connections between nodes may be created via the process of "training" the network, in which elements from a training data 804 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 8, machine-learning algorithms may include at least a supervised machine-learning process 828. At least a supervised machine-learning process 828, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs as described in this disclosure as inputs, outputs as described in this disclosure as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 804. Persons skilled in the art, upon reviewing the entirety of this disclosure, will be aware of various possible variations of at least a supervised machine-learning process 828 that may be used to determine relation between inputs and outputs. Supervised machine-learning processes may include classification algorithms as defined above.

Further referring to FIG. 8, machine learning processes may include at least an unsupervised machine-learning processes 832. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 8, machine-learning module 800 may be designed and configured to create a machine-learning model 824 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 8 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 8, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 9:
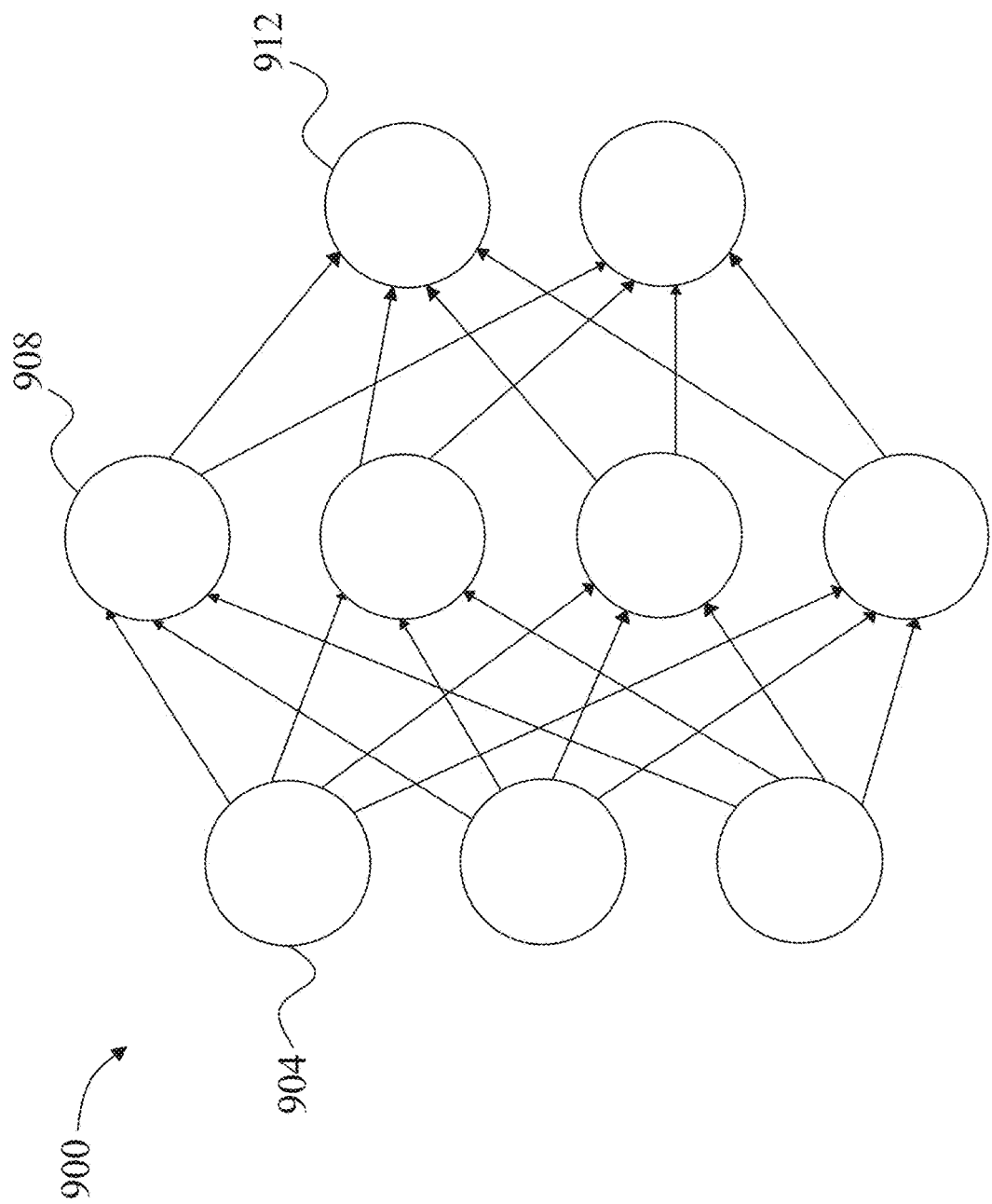
FIG. 9 is a block diagram illustrating an exemplary embodiment of neural network in accordance with one or more embodiments of the present disclosure.

Referring now to FIG. 9, an exemplary embodiment of neural network 900 is illustrated. A neural network 900 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 904, one or more intermediate layers 908, and an output layer of nodes 912. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 10:
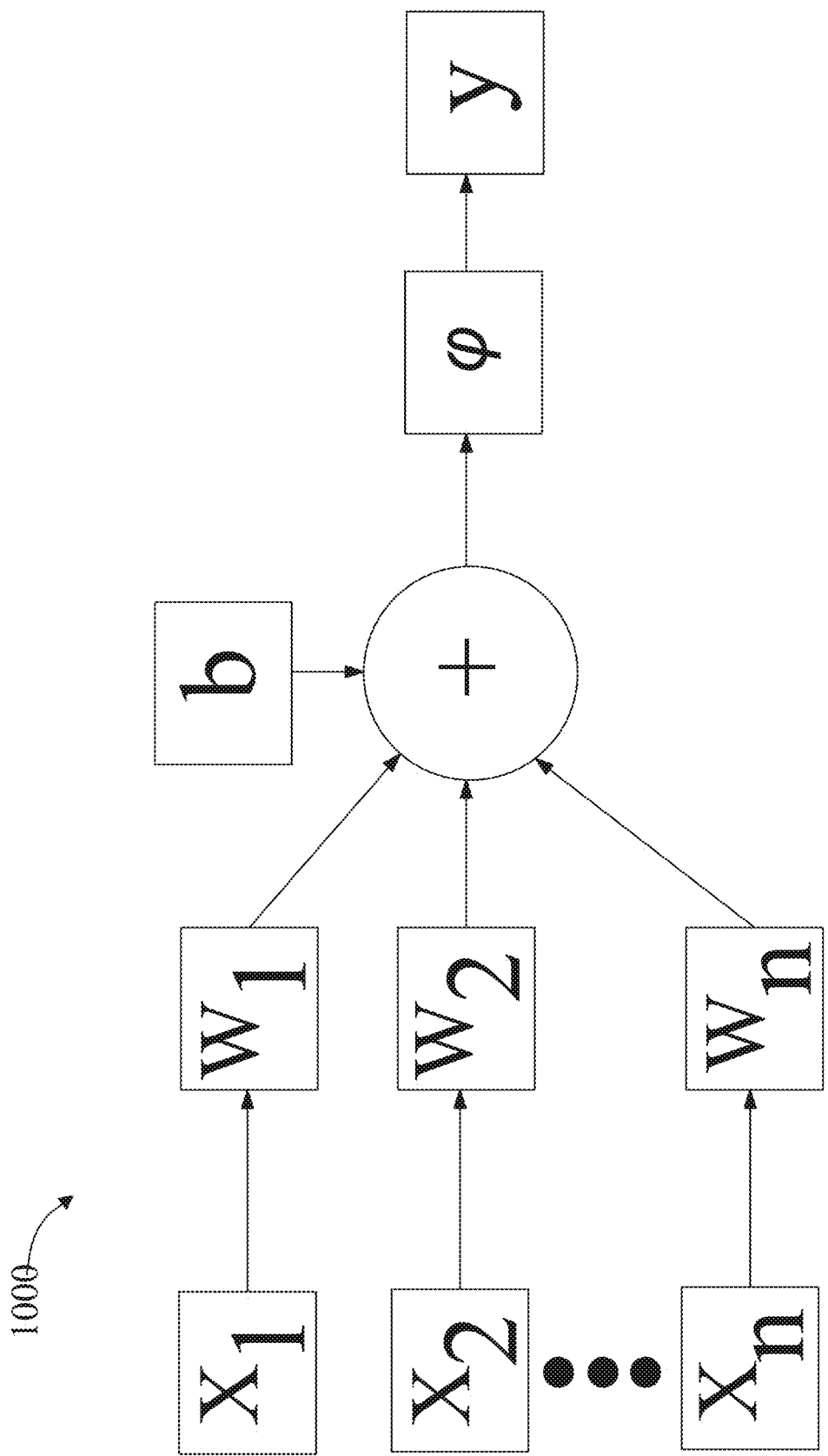
FIG. 10 is a block diagram illustrating an exemplary embodiment of a node of a neural network in accordance with one or more embodiments of the present disclosure.

Referring now to FIG. 10, an exemplary embodiment of a node of a neural network 1000 is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1-e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 11:
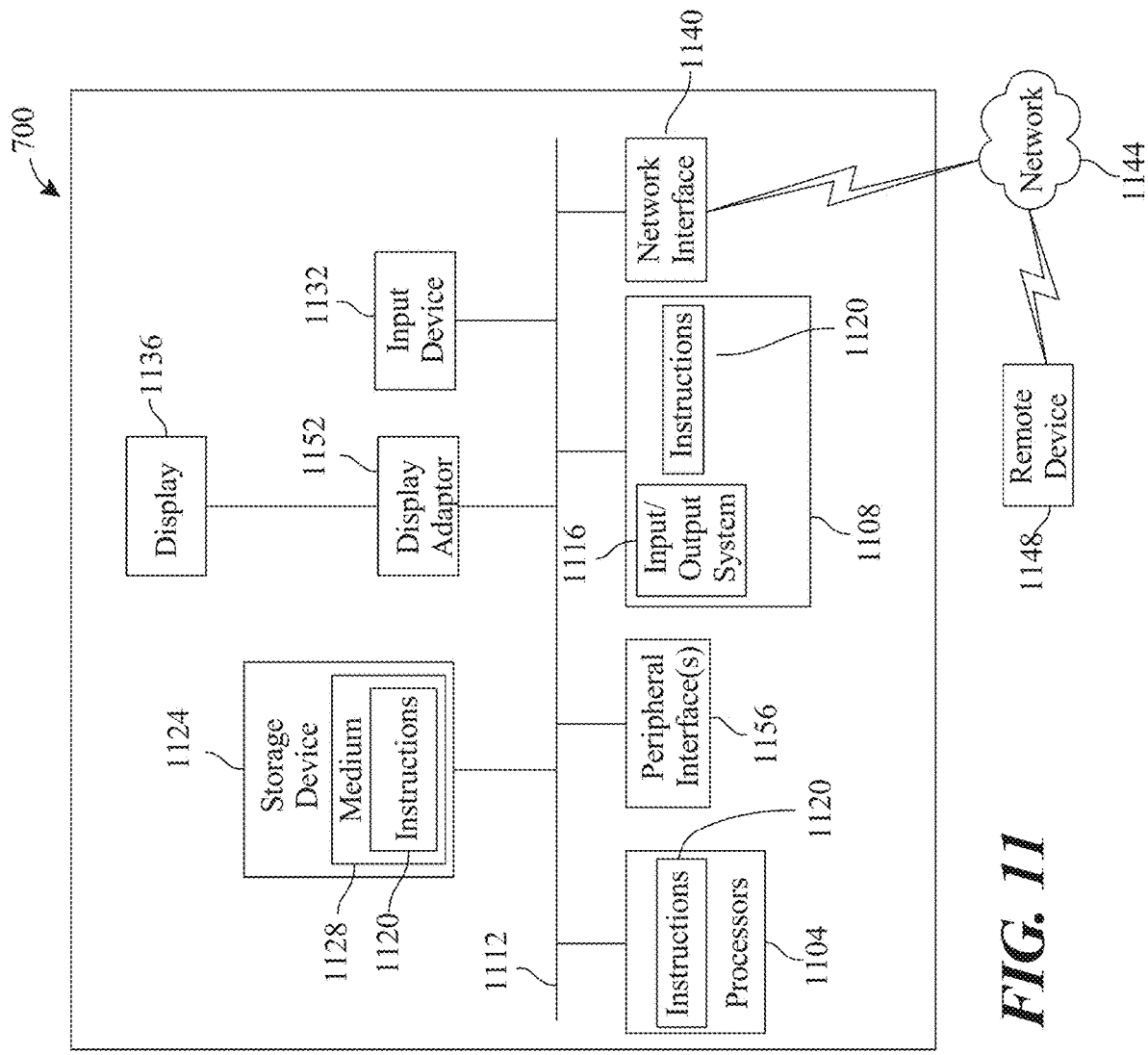
FIG. 11 is a block diagram of a computing system that can be used to implement any one or more of the methodologies disclosed herein and any one or more portions thereof.

FIG. 11 shows a diagrammatic representation of one embodiment of a computing device in the exemplary form of a computer system 1100 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1100 includes a processor 1104 and a memory 1108 that communicate with each other, and with other components, via a bus 1112. Bus 1112 may include any of several types of bus structures including, but not limited to, a memory bus, a memory controller, a peripheral bus, a local bus, and any combinations thereof, using any of a variety of bus architectures.

Processor 1104 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1104 may be organized according to Von Neumann and/or Harvard architecture as a non-limiting example. Processor 1104 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC)

Memory 1108 may include various components (e.g., machine-readable media) including, but not limited to, a random-access memory component, a read only component, and any combinations thereof. In one example, a basic input/output system 1116 (BIOS), including basic routines that help to transfer information between elements within computer system 1100, such as during start-up, may be stored in memory 1108. Memory 1108 may also include (e.g., stored on one or more machine-readable media) instructions (e.g., software) 1120 embodying any one or more of the aspects and/or methodologies of the present disclosure. In another example, memory 1108 may further include any number of program modules including, but not limited to, an operating system, one or more application programs, other program modules, program data, and any combinations thereof.

Computer system 1100 may also include a storage device 1124. Examples of a storage device (e.g., storage device 1124) include, but are not limited to, a hard disk drive, a magnetic disk drive, an optical disc drive in combination with an optical medium, a solid-state memory device, and any combinations thereof. Storage device 1124 may be connected to bus 1112 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1124 (or one or more components thereof) may be removably interfaced with computer system 1100 (e.g., via an external port connector (not shown)). Particularly, storage device 1124 and an associated machine-readable medium 1128 may provide nonvolatile and/or volatile storage of machine-readable instructions, data structures, program modules, and/or other data for computer system 1100. In one example, software 1120 may reside, completely or partially, within machine-readable medium 1128. In another example, software 1120 may reside, completely or partially, within processor 1104.

Computer system 1100 may also include an input device 1132. In one example, a user of computer system 1100 may enter commands and/or other information into computer system 1100 via input device 1132. Examples of an input device 1132 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1132 may be interfaced to bus 1112 via any of a variety of interfaces (not shown) including, but not limited to, a serial interface, a parallel interface, a game port, a USB interface, a FIRE-WIRE interface, a direct interface to bus 1112, and any combinations thereof. Input device 1132 may include a touch screen interface that may be a part of or separate from display 1136, discussed further below. Input device 1132 may be utilized as a user selection device for selecting one or more graphical representations in a graphical interface as described above.

A user may also input commands and/or other information to computer system 1100 via storage device 1124 (e.g., a removable disk drive, a flash drive, etc.) and/or network interface device 1140. A network interface device, such as network interface device 1140, may be utilized for connecting computer system 1100 to one or more of a variety of networks, such as network 1144, and one or more remote devices 1148 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1144, may employ a wired and/or a wireless mode of communication. In general, any network topology may be used. Information (e.g., data, software 1120, etc.) may be communicated to and/or from computer system 1100 via network interface device 1140.

Computer system 1100 may further include a video display adapter 1152 for communicating a displayable image to a display device, such as display device 1136. Examples of a display device include, but are not limited to, a liquid crystal display (LCD), a cathode ray tube (CRT), a plasma display, a light emitting diode (LED) display, and any combinations thereof. Display adapter 1152 and display device 1136 may be utilized in combination with processor 1104 to provide graphical representations of aspects of the present disclosure. In addition to a display device, computer system 1100 may include one or more other peripheral output devices including, but not limited to, an audio speaker, a printer, and any combinations thereof. Such peripheral output devices may be connected to bus 1112 via a peripheral interface 1156. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve apparatuses, methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A bioprinter for building an implant by sequential deposition of material, the bioprinter comprising:
    a base plate;
    a plurality of printheads, each printhead comprising a nozzle defining a lumen, wherein each printhead is configured to deposit a material on the base plate using the lumen;
    a plurality of concentric arcuate tracks configured to move independently relative to each other, each arcuate track comprising a groove, wherein each printhead is slidably attached to a respective arcuate track and at least partially disposed within a respective groove;
    a frame including a plurality of concentric orbital tracks; each orbital track being configured to independently rotate about a central vertical axis of the frame and being rotatably attached to a respective arcuate track by a respective pair of rotational joints; and
    a controller communicatively connected to the base plate, the arcuate track, and the frame, wherein the controller is configured to control movement of the base plate, the plurality of arcuate tracks, and the plurality of orbital tracks.

2. The bioprinter of claim 1, wherein the plurality of concentric arcuate tracks include a first arcuate track, a second arcuate track, and a third arcuate track, wherein each of the first arcuate track, the second arcuate track, and the third arcuate track are configured to move independently relative to each other.

3. The bioprinter of claim 2, wherein:
    the printheads comprises:
        a first printhead slidably attached to the first arcuate track,
        a second printhead slidably attached to the second arcuate track, and
        a third printhead slidably attached to the third arcuate track; and
    each printhead is configured to traverse along a groove of each corresponding arcuate track.

4. The bioprinter of claim 2, wherein:
    the plurality of concentric orbital tracks include:
        a first orbital track pivotably attached to the first arcuate track;
        a second orbital track pivotably attached to the second arcuate track; and
        a third orbital track pivotably attached to the third arcuate track; and
    each of the first orbital track, second orbital track, and third orbital track is configured to rotate about a central vertical axis of the frame.

5. The bioprinter of claim 1, wherein each arcuate track comprises a first end and a second end, wherein the first end and the second end are pivotably attached to a respective orbital track.

6. The bioprinter of claim 1, wherein the printheads each include a reservoir in fluidic communication with the lumen and configured to store the material until the material is deposited onto the base plate.

7. The bioprinter of claim 1, wherein the printheads each include an environmental control, wherein the environmental control is configured to adjust environmental conditions of the reservoir.

8. The bioprinter of claim 1, wherein each nozzle includes a telescoping nozzle configured to extend and retract relative to the implant.

9. The bioprinter of claim 1, further comprising a shaft, wherein the base plate is moveably attached to the shaft and the shaft is configured to translate base plate parallel to a central vertical axis of the frame.

10. The bioprinter of claim 1, wherein:
    each printhead comprises a motor;
    each printhead comprises a first conductor;
    each groove comprises a second conductor; and
    each first conductor and second conductor abut such that electrical power may be transferred from the second conductor to the first conductor to power the motor of each printhead.

11. A bioprinter system for building an implant by sequential deposition of material, the bioprinter system comprising:
    a base plate;
    a printhead comprising a nozzle, wherein the nozzle defines a lumen, wherein the printhead is configured to deposit a material on the base plate using the lumen;
    an arcuate track comprising a groove, wherein the printhead is slidably attached to the arcuate track and at least partially disposed within the groove;
    a frame rotatably attached to the arcuate track;
    an environmental chamber configured to provide specific environmental conditions for the material;
    a shaft, wherein the base plate is moveably attached to the shaft and the shaft is configured to translate the base plate into and out of the environmental chamber and parallel to a central vertical axis of the frame
    a controller communicatively connected to the base plate, the arcuate track, the frame, and the environmental chamber, wherein the controller is configured to control movement of move of the base plate, the arcuate track, and the frame.

12. The bioprinter system of claim 11, wherein the environmental chamber is configured to contain an isotonic saline solution.

13. The bioprinter system of claim 12, wherein the shaft is configured to translate the base plate and a workpiece manufactured by the bioprinter system to the isotonic saline solution during manufacture of the workpiece.

14. The bioprinter system of claim 11, further comprising a laser assembly communicatively connected to the controller, wherein the laser assembly is configured to etch the deposited material.

15. The bioprinter system of claim 11, wherein the arcuate track comprises plurality of concentric arcuate tracks, the plurality of concentric arcuate tracks comprising a first arcuate track, a second arcuate track, and a third arcuate track, wherein each of the first arcuate track, the second arcuate track, and the third arcuate track are configured to move independently relative to each other.

16. The bioprinter system of claim 15, wherein:
the printhead comprises a first printhead slidably attached to the first arcuate track, a second printhead slidably attached to the second arcuate track, and a third printhead slidably attached to the third arcuate track; and
each printhead is configured to traverse along a groove of each corresponding arcuate track.

17. The bioprinter system of claim 15, wherein:
the frame comprises a plurality of concentric orbital tracks, the plurality of concentric orbital track comprising:
 a first orbital track pivotably attached to the first arcuate track;
 a second orbital track pivotably attached to the second arcuate track; and
 a third orbital track pivotably attached to the third arcuate track; and
each of the first orbital track, the second orbital track, and the third orbital track is configured to rotate about a central vertical axis of the frame.

18. The bioprinter system of claim 11, wherein the printhead comprises a reservoir in fluidic communication with the lumen and configured to store the material until the material is deposited onto the base plate.

19. The bioprinter system of claim 11, the printhead comprising an environmental control, wherein the environmental control is configured to adjust environmental conditions of the reservoir.

20. The bioprinter system of claim 11, wherein the nozzle includes a telescoping nozzle configured to extend and retract relative to the implant.

\* \* \* \* \*